US012427349B1

(12) United States Patent
Homer et al.

(10) Patent No.: US 12,427,349 B1
(45) Date of Patent: Sep. 30, 2025

(54) HOLE SAW BREACHING FIREFIGHTING NOZZLE

(71) Applicant: The United States of America, as represented by the Secretary of the Navy, Arlngton, VA (US)

(72) Inventors: Vincent H. Homer, Independence, OR (US); Eric Steven Sievert, Ridgecrest, CA (US); Ross Allen Davidson, Ridgecrest, CA (US); Matthew Francis Hardy, Westville, NJ (US); Daniel Brian Meighan, Toms River, NJ (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 1532 days.

(21) Appl. No.: 16/873,204

(22) Filed: May 22, 2020

Related U.S. Application Data

(60) Provisional application No. 63/100,079, filed on May 30, 2019.

(51) Int. Cl.
*A62C 31/02* (2006.01)
*A62C 31/22* (2006.01)
*B26D 3/10* (2006.01)

(52) U.S. Cl.
CPC .............. *A62C 31/02* (2013.01); *A62C 31/22* (2013.01); *B26D 3/10* (2013.01)

(58) Field of Classification Search
CPC ............ A62C 31/02; A62C 31/22; B26D 3/10
USPC ...................... 239/271, 272, 525; 169/62, 70
See application file for complete search history.

(56) References Cited

U.S. PATENT DOCUMENTS

| | | | | |
|---|---|---|---|---|
| 2,250,670 A * | 7/1941 | Joy | E21B 7/005 | 175/173 |
| 2,251,175 A * | 7/1941 | Tappe | A62C 31/24 | 169/70 |
| 3,865,194 A * | 2/1975 | Chatfield, Jr. | A62C 31/22 | 239/271 |
| 4,271,909 A * | 6/1981 | Chatfield, Jr. | A62C 31/22 | 239/271 |
| 4,676,319 A * | 6/1987 | Cuthbertson | A62C 31/22 | 239/271 |
| 5,577,561 A * | 11/1996 | Cook | A62C 31/22 | 169/70 |

(Continued)

*Primary Examiner* — Steven J Ganey
(74) *Attorney, Agent, or Firm* — Naval Air Warfare Center Weapons Division; Jimmy M. Sauz

(57) ABSTRACT

A hole saw breaching firefighting nozzle may comprise outer and inner housings, a diffuser assembly, hole saw assembly, and drivetrain assembly. The inner housing may be concentrically disposed within the outer housing to create an annular flow region. The diffuser assembly may comprise an end cap coupled to an upstream end of the outer housing. An orifice plate may be coupled to the end cap via linear bearing shafts. A flow control ring may slide forward or rearward between the orifice plate and end cap via linear bearing shafts to control fluid flow communication between the orifice plate and annular flow region. The drivetrain assembly may rotatably couple to the orifice plate. The hole saw assembly may operably couple to the drivetrain assembly. The inner housing may slide forward and rearward. The downstream end of the drivetrain assembly may be in fluid communication with the annular flow region.

20 Claims, 12 Drawing Sheets

(56) References Cited

U.S. PATENT DOCUMENTS 11,395,933 B2 * 7/2022 Rosenfeldt ............. A62C 31/22

* cited by examiner

HOLE SAW BREACHING FIREFIGHTING NOZZLE

CROSS-REFERENCE TO RELATED APPLICATIONS

This Application claims the benefit of U.S. provisional patent application No. 63/100,079, filed on May 30, 2019, titled "HOLE SAW BREACHING FIREFIGHTING NOZZLE," by co-inventors Vincent H. Homer, Eric Steven Sievert, and Ross Allen Davidson, the contents of which are incorporated herein by this reference and to which priority is claimed.

STATEMENT REGARDING FEDERALLY SPONSORED RESEARCH OR DEVELOPMENT

The invention described herein may be manufactured and used by or for the United States of America for governmental purposes without the payment of any royalties thereon or therefor.

FIELD OF USE

The present disclosure relates generally to firefighting nozzles, and more particularly, (U) firefighting nozzles configured to breach a bulkhead while providing an immediate firefighting response without additional equipment.

BACKGROUND

Certain aircrafts are equipped with internal weapon bays, which are compartments used to carry bombs and usually within the aircraft's fuselage. These weapon bays, however, generally lack space and weight tolerances to accommodate a fire suppression system. As a result, in the event of an internal weapon bay fire, these aircrafts do not have the capability to extinguish the fire or cool weapons exposed to fire without the aid of outside firefighting efforts. To further exacerbate the problem, outside firefighting efforts likely require breaching the composite skin of the aircraft in order to access and extinguish the source of the fire. In this regard, it is desirable to have a tool or device that extinguishes fires while having the capability of accessing the interior space of a bulkhead without the need of additional equipment.

SUMMARY OF ILLUSTRATIVE EMBODIMENTS

To minimize the limitations in the related art and other limitations that will become apparent upon reading and understanding the present specification, the following discloses a new and useful hole saw breaching firefighting nozzle.

One embodiment may be a hole saw breaching firefighting nozzle, comprising: an outer housing substantially cylindrical in shape and comprising a flow reducer coupled to a downstream end of the outer housing; an inner housing concentrically disposed within and axially spaced from the outer housing to create an annular flow region between the outer housing and the inner housing; a diffuser assembly, comprising: an end cap coupled to an upstream end of the outer housing and having a center opening; an orifice plate disposed within the inner housing and coupled to the end cap via a plurality of linear bearing shafts; and a flow control ring coupled near an upstream end of the inner housing and disposed between the orifice plate and the end cap, the flow control ring being adapted to slide forward or rearward when the inner housing moves forward or rearward in order to control fluid flow communication between the orifice plate and the annular flow region; a drivetrain assembly substantially disposed within the inner housing and having an upstream end rotatably coupled to the orifice plate; and a hole saw assembly operably coupled to the drivetrain assembly and rotatably coupled to the flow reducer; wherein the inner housing may be in a sliding relationship with the plurality of linear bearing shafts aid may be adapted to move forward and rearward with respect to the orifice plate and the flow reducer; and wherein a downstream end of the drivetrain assembly may be in fluid communication with the annular flow region. The hole saw assembly may comprise: a dog crown rotatably coupled to the flow reducer; a hole saw disposed within the dog crown and in sliding relationship with the dog crown, the hole saw being coupled to a downstream end of the drivetrain assembly; and one or more hooks, each having a base end rotatably coupled to the dog crown and a mid-portion rotatably coupled to a ring disposed within the hole saw, such that, when the hole saw slides forward or rearward relative to the dog crown, the one or more hooks may rotate between a latched position and an unlatched position, respectively. The drivetrain assembly may comprise: a turbine; a planetary gearbox operably coupled to a downstream end of the turbine; and a mandrel operably coupled to a downstream end of the planetary gearbox. The hole saw assembly may further comprise a pilot bit coupled to the mandrel. The planetary gearbox may have a reduction ratio between 12:1 and 20:1. The hole saw breaching firefighting nozzle may further comprise a ball shut-off coupled to an upstream end of the end cap and comprising a ball valve and a hose opening in fluid communication with the center opening of the end cap. The hole saw breaching firefighting (U) nozzle may further comprise a skirt coupled to a downstream end of the flow reducer. The hole saw breaching firefighting nozzle may further comprise a handle adapted to actuate the forward and rearward movement of the inner housing.

Another embodiment may be a hole saw breaching firefighting nozzle, comprising: an outer housing substantially cylindrical in shape and centered about a central longitudinal axis, the outer housing comprising a flow reducer coupled to a downstream end of the outer housing; an inner housing concentrically disposed within and axially spaced from the outer housing to create an annular flow region between the outer housing and the inner housing, the inner housing comprising one or more gaps at an upstream end of the inner housing; a diffuser assembly, comprising: an end cap coupled to an upstream end of the outer housing and having a center opening and an annular space; an orifice plate disposed within the inner housing and comprising a plurality of orifices disposed in a radial configuration, the orifice plate being coupled to the end cap via a plurality of linear bearing shafts, such that the center opening and the orifice plate are disposed along the central longitudinal axis; and a flow control ring coupled near an upstream end of the inner housing and disposed between the orifice plate and the end cap, the flow control ring being adapted to slide forward or rearward when the inner housing moves forward or rearward in order to control fluid flow communication between the orifice plate and the annular flow region; wherein when the inner housing moves forward, the flow control ring may slide forward and may obstruct the plurality of orifices while permitting the fluid flow communication to the one or more gaps of the inner housing, and wherein when the inner housing moves rearward, the flow control ring may slide rearward and may permit the fluid flow communication to the plurality of orifices, the one or more gaps entering the annular space of the end cap and being obstructed; a drivetrain assembly substantially disposed within the inner housing and having an upstream end rotatably coupled to the orifice plate, the drivetrain assembly, comprising: a turbine; a planetary gearbox operably coupled to a downstream end of the turbine; and a mandrel operably coupled to a downstream end of the planetary gearbox; and a hole saw assembly operably coupled to the drivetrain assembly and rotatably coupled to the flow reducer; wherein the inner housing may be in a sliding relationship with the plurality of linear bearing shafts and may be adapted to move forward and rearward with respect to the orifice plate and the flow reducer; and wherein a downstream end of the drivetrain assembly may be in fluid communication with the annular flow region. The hole saw assembly may comprise: a dog crown rotatably coupled to the flow reducer; a hole saw disposed within the dog crown and in sliding relationship with the dog crown, the hole saw being coupled to a downstream end of the drivetrain assembly; and a plurality of hooks, each having a base end rotatably coupled to the dog crown and a mid-portion rotatably coupled to a ring disposed within the hole saw, such that, when the hole saw slides forward or rearward relative to the dog crown, the plurality of hooks may rotate between a latched position and an unlatched position, respectively. The hole saw assembly may further comprise a pilot bit coupled to the mandrel and disposed along the central longitudinal axis. The planetary gearbox may have a reduction ratio between 12:1 and 20:1. The hole saw breaching firefighting nozzle may further comprise a ball shut-off coupled to an upstream end of the end cap and comprising a ball valve and a hose opening in fluid communication with the center opening of the end cap. The hole saw breaching firefighting nozzle may further comprise a skirt coupled to a downstream end of the flow reducer and comprising a plurality of biasing members. The hole saw breaching firefighting nozzle may further comprise a handle adapted to actuate the forward and rearward movement of the inner housing.

Another embodiment may be a hole saw breaching firefighting nozzle, comprising: an outer housing substantially cylindrical in shape and centered about a central longitudinal axis, the outer housing comprising a flow reducer coupled to a downstream end of the outer housing; an inner housing concentrically disposed within and axially spaced from the outer housing to create an annular flow region between the outer housing and the inner housing, the inner housing comprising one or more gaps at an upstream end of the inner housing; a diffuser assembly, comprising: an end cap coupled to an upstream end of the outer housing and having a center opening and an annular space; an orifice plate disposed within the inner housing and comprising a plurality of orifices disposed in a radial configuration, the orifice plate being coupled to the end cap via a plurality of linear bearing shafts, such that the center opening and the orifice plate may be disposed along the central longitudinal axis; and a flow control ring coupled adjacently to the one or more gaps of the inner housing and disposed between the orifice plate and the end cap, the flow control ring being adapted to slide forward or rearward when the inner housing moves forward or rearward in order to control fluid flow communication between the orifice plate and the annular flow region; wherein when the inner housing moves forward, the flow control ring may slide forward and may obstruct the plurality of orifices while permitting the fluid flow communication to the one or more gaps of the inner housing, and wherein when the inner housing moves rearward, the flow control ring may slide rearward and may permit the fluid flow communication to the plurality of orifices, the one or more gaps entering the annular space of the end cap and being obstructed; a drivetrain assembly substantially disposed within the inner housing and having an upstream end rotatably coupled to the orifice plate, the drivetrain assembly, comprising: a turbine adapted to move forward and rearward with respect to the orifice plate; a planetary gearbox operably coupled to a downstream end of the turbine; and a mandrel operably coupled to a downstream end of the planetary gearbox; and a hole saw assembly operably coupled to the mandrel and rotatably coupled to the flow reducer, the hole saw assembly comprising: a dog crown assembly rotatably coupled to the flow reducer via a stator assembly; a hole saw disposed within the dog crown and in sliding relationship with the dog crown, the hole saw being coupled to a downstream end of the drivetrain assembly; and a plurality of hooks, each having a base end rotatably coupled to the dog crown and a mid-portion rotatably coupled to a ring disposed within the hole saw, such that, when the hole saw slides forward or rearward relative to the dog crown, the plurality of hooks may rotate between a latched position and an unlatched position, respectively; and a pilot bit coupled to the mandrel and disposed along the central longitudinal axis; wherein the inner housing may be in a sliding relationship with the plurality of linear bearing shafts and may be adapted to move forward and rearward with respect to the orifice plate and the flow reducer; and wherein a downstream end of the drivetrain assembly may be in fluid communication with the annular flow region. The planetary gearbox may have a reduction ratio between 12:1 and 20:1. The hole saw breaching firefighting nozzle may further comprise a ball shut-off coupled to an upstream end of the end cap and comprising a ball valve and a hose opening in fluid communication with the center opening of the end cap. The hole saw breaching firefighting nozzle may further comprise a skirt coupled to a downstream end of the flow reducer and comprising a plurality of biasing members. The hole saw breaching firefighting nozzle may further comprise a handle adapted to actuate the forward and rearward movement of the inner housing.

Embodiments of the hole saw breaching firefighting nozzle may drive the turbine at various (U) speeds to cut an airframe or bulkhead. For example, embodiments of the hole saw breaching firefighting nozzle may comprise a planetary gearbox operably coupled between the turbine and hole saw. This may reduce the hole saw rpm and increase the available torque and improved cutting performance. For example, embodiments of the hole saw breaching firefighting nozzle may use a turbine capable of supplying over 2 HP at 70 psi and deliver over 9 gpm.

Other embodiments of the hole saw breaching firefighting nozzle may include a planetary gearbox with a 16:1 reduction ratio and a large diameter turbine. Other embodiments may utilize a 20:1 reduction driven by a smaller diameter turbine. The gearbox ratio for other embodiments may depend on the loaded rpm of the turbine and the optimal cutting rpm for the hole saw.

Embodiments of the hole saw breaching firefighting nozzle may allow the operator to drill a hole through an aircraft fuselage or other comparable bulkhead and provide the immediate ability to apply firefighting foam to the interior space using only the power contained in the firefighting hose stream. The ability to immediately apply firefighting foam through a bulkhead without the removal of a cutting tool provides immediate protection to the operator by reducing potential exposures to respiratory hazards or the potential release of extremely hot and potentially unignited flammable gases to an oxygen rich atmosphere. Once the hole is created, the hooks located at the hole saw assembly may serve as a dogging mechanism by latching the hole saw breaching firefighting nozzle to the structure, thereby allowing the user to retreat to a safe distance while the interior foaming takes place. In other embodiments, retraction or locking of the hooks may be controlled by a handle.

It is an object to provide a hole saw breaching firefighting nozzle that may be used in various applications. For example, the hole saw breaching firefighting nozzle may be used on land-based vehicles such as cars and trucks in order to access and extinguish a fire within the interior space of that vehicle without the need of additional equipment. The hole saw breaching firefighting nozzle may also be used to access and extinguish a fire source within building structures. Other applications may also include breaching various equipment (e.g., lab equipment, field equipment) in order to access and extinguish fire sources within such equipment.

It is an object to provide a hole saw breaching firefighting nozzle that may utilize firefighting foam. Given that the weight/head pressure of the water may push the water past the seams of the bay doors of certain aircraft water may not completely fill the bay for those aircrafts. Thus, embodiments of the hole saw breaching firefighting nozzle are preferably configured to utilize firefighting foam in order to provide foam buildup for filling the bay of the aircraft.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are illustrative embodiments. They do not illustrate all embodiments. They do not set forth all embodiments. Other embodiments may be used in addition or instead. Details, which may be apparent or unnecessary, may be omitted to save space or for more effective illustration. Some embodiments may be practiced with additional components or steps and/or without all of the components or steps, which are illustrated. When the same numeral appears indifferent drawings, it is intended to refer to the same or like components or steps.

FIG. 1 is an illustration of a side elevation view of one embodiment of a downstream end of the hole saw breaching firefighting nozzle without the skirt and shows the hole saw assembly in the latched position.

DETAILED DESCRIPTION OF THE ILLUSTRATIVE EMBODIMENTS

Figure 1A:
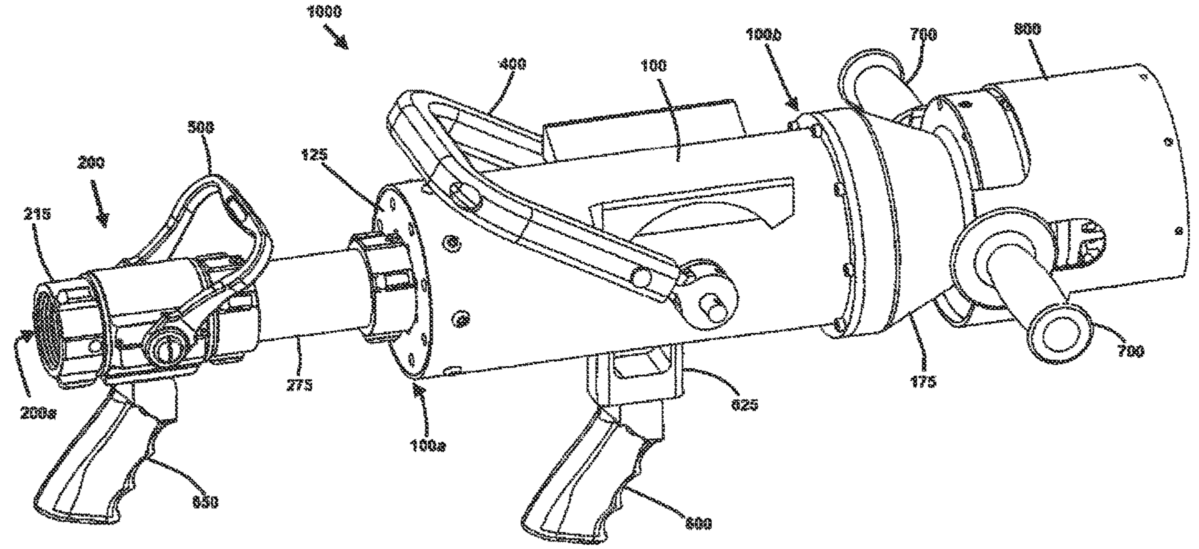
FIGS. 1A and 1B are illustrations of front and rear perspective views, respectively, of one embodiment of a hole saw breaching firefighting nozzle.

In the following description of illustrative embodiments, numerous specific details are set forth in order to provide a thorough understanding of various aspects of one or more embodiments of the hole saw breaching firefighting nozzle (hereinafter "hole saw nozzle"). However, these embodiments may be practiced without some or all of these specific details. In other instances, well-known methods, procedures, and/or components have not been described in detail so as not to unnecessarily obscure the aspects of these embodiments.

Before the embodiments are disclosed and described, it is to be understood that these embodiments are not limited to the particular structures, process steps, or materials disclosed herein, but is extended to equivalents thereof as would be recognized by those ordinarily skilled in the relevant arts. It should also be understood that the terminology used herein is used for the purpose of describing particular embodiments only and is not intended to be limiting.

Reference throughout this specification to "one embodiment" "an embodiment," or "another embodiment" may refer to a particular feature, structure, or characteristic described in connection with the embodiments of the present disclosure. Thus, appearances of the phrases "in one embodiment" or "in an embodiment" in various places throughout this specification may not necessarily refer to the same embodiment.

Furthermore, the described features, structures, or characteristics may be combined in any suitable manner in various embodiments. In the following description, numerous specific details are provided, such as examples of materials, fasteners, sizes, lengths, widths, shapes, etc . . . , to provide a thorough understanding of the embodiments. One skilled in the relevant art will recognize, however, that the scope of protection can be practiced without one or more of the specific details, or with other methods, components, materials, etc . . . . In other instances, well-known structures, materials, or operations are generally not shown or described in detail to avoid obscuring aspects of the disclosure.

DEFINITIONS

In the following description, certain terminology is used to describe certain features of the embodiments of the hole saw nozzle in accordance with the present disclosure. For example, as used herein, unless otherwise specified, the term “substantially” refers to the complete, or nearly complete, extent or degree of an action, characteristic, property, state, structure, item, or result. As an arbitrary example, an object that is “substantially” surrounded would mean that the object is either completely surrounded or nearly completely surrounded. The exact allowable degree of deviation from absolute completeness may in some cases depend on the specific context. However, generally speaking, the nearness of completion will be so as to have the same overall result as if absolute and total completion were obtained.

The use of“substantially” is equally applicable when used in a negative connotation to refer to the complete or near complete lack of an action, characteristic, property, state, structure, item, or result. As another arbitrary example, a composition that is “substantially free of” welding joints would either completely lack welding joints, or so nearly completely lack welding joints that the effect would be the same as if it completely lacked welding joints. In other words, a composition that is “substantially free of” an ingredient or element may still actually contain such item as long as there is no measurable effect thereof.

As used herein, the terms “foam,” “firefighting foam,” and “flowing agent” may refer to foam used for fire extinguishment. The expanding foam blanket may be used to fill the upper portions weapons bay, cool the weapons, surrounding bulkheads and aviation equipment. It should also extinguish any local Class A or B fires by cooling materials and or flowing over any liquid fuel, therefore, preventing its contact with oxygen and thereby resulting in suppression of the combustion.

As used herein, the term “approximately” may refer to a range of values of 10% of a specific value. For example, the expression “approximately 150 inches” may comprise the values of 150 inches ±10%, i.e. the values from 135 inches to 165 inches.

The present disclosure relates generally to firefighting nozzles, and more particularly, to firefighting nozzles configured to breach an aircraft frame, vehicle, or structure and provide water, firefighting foam, or flowing agent directly within that aircraft, vehicle, or structure. In general, various fighter aircraft may be equipped with an internal weapons bay, which generally lacks space and weight tolerances to accommodate a fire suppression system. As a result, the weapons bay may lack the capability of extinguishing internal weapon bay fires or cool weapons exposed to fire without the aid of outside firefighting efforts. Importantly, newer aircrafts generally have incorporated the use of carbon fiber composite as an airframe structural material, which may render some firefighting equipment inadequate for use in penetration or breaching. Introducing other bulkhead breaching emergency firefighting equipment may also become too dangerous to use when in close proximity to the weapons of the aircraft Embodiments of the hole saw nozzle disclosed herein solve this problem by breaching the composite skin or bulkhead of an aircraft and directing water, foam, or flowing agent to the fire source with speed, precision, and efficiency. The hole saw nozzle may utilize a water driven hole saw with the capability to create high flow rates and quality foam expansion ratios and may provide the firefighter the ability to abandon the firefighting nozzle by latching the hole saw nozzle into place via a dogging mechanism or retractable hooks. In this manner, the firefighter may latch the hole saw nozzle to the hole and provide flowing agent or cooling water. Additionally, the hole saw nozzle may utilize pressure from the water or fluid source to serve as an important thermal shield or barrier to the user until the material being cut is penetrated. This shield is simply water, foam, or flowing agent being directed and discharged through the sides or bottom of the hole saw nozzle, thereby creating a curtain of water or foam in-between the user and the fire hazard and knocking down any hazardous airborne composite fibers until the application hole is cut. The moment that a hole is created, the hose stream immediately penetrates through the bulkhead and into the fire source, away from the user. Importantly, the hole saw nozzle allows the user to introduce a water/foam source into the hole without removing the hole saw or penetration device after the cut has been made; thereby reducing exposure to the user of flammable/explosive gases.

Embodiments of the hole saw nozzle may comprise carbide or diamond tipped teeth and may turn or rotate based on energy extracted from the hose stream deployed. A turbine may actuate a planetary gearbox with the necessary speed reduction ratio for the hole saw to rotate at approximately 200400 rpm. In one embodiment, the 200-400 rpm may be specified by the manufacture for the (U) carbide/diamond grit type. In order to reduce the hazard exposure for the operator using the hole saw nozzle, the hole saw nozzle may comprise a plurality of retractable hooks, which may serve as a dogging mechanism. By latching and coupling the hole saw nozzle to the hole, the firefighting and cooling function of the hole saw nozzle may continue to function unattended, In the accompany drawings, like reference numbers indicate like elements. Reference character 1000 depict various embodiments of the hole saw breaching firefighter nozzle and is sometimes referred to as hole saw nozzle. Other variations, of course, are possible without detracting from the merits or generalities of the embodiments of the invention.

Figure 1B:
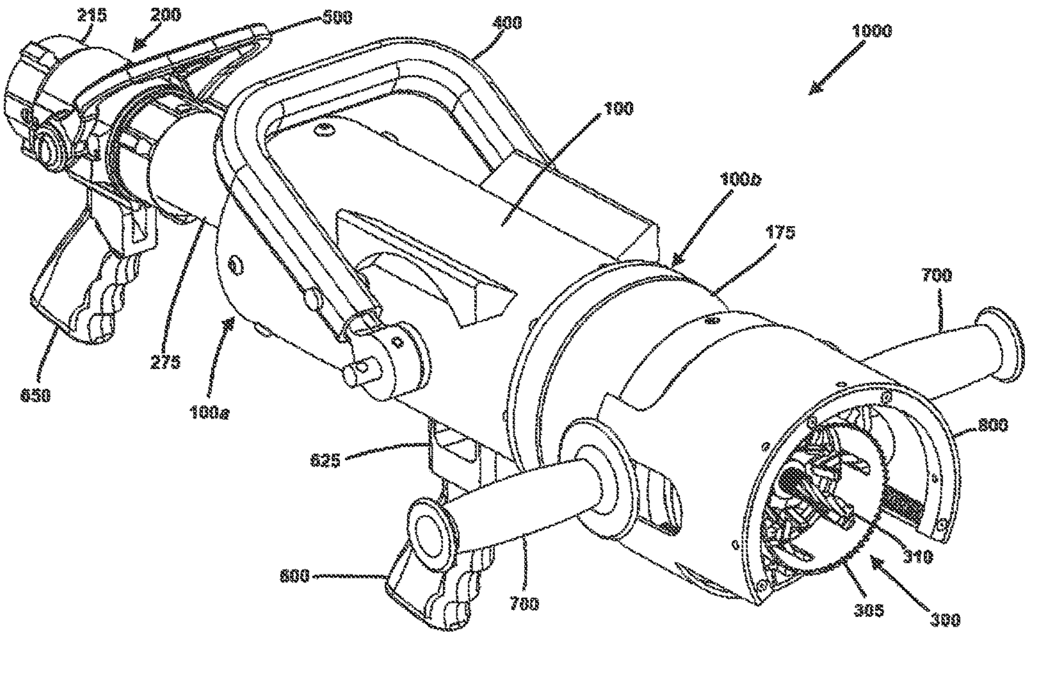

FIGS. 1A and 1B are illustrations of front and rear perspective views, respectively, of one embodiment of a hole saw breaching firefighting nozzle or hole saw nozzle 1000. As discussed above, the hole saw nozzle 1000 is preferably a water/firefighting foam delivery nozzle utilizing a hole saw configured to breach a composite frame of an aircraft, including other vehicles and structures. The hole saw nozzle 1000 is preferably configured to deliver a stream of water, foam, or flowing agent into the interior of an aircraft in the event an internal fire occurs when the aircraft is grounded and the weapons bay is not capable of being opened under aircraft battery/hydraulic power or manual opening procedures. This may be in the case of a nose or main landing gear failures, damage normally sustained from hard impact. Given that newer aircraft have incorporated various composite material (e.g., carbon fiber) for its airframe, embodiments of the hole saw nozzle 1000 are preferably capable of penetrating the airframe of the aircraft in order to inject the stream of water, foam, or flowing agent for fire extinguishing.

Specifically, the hole saw nozzle 1000 may be configured to allow a user to create a hole through an aircraft (e.g., fuselage or comparable bulkhead) and deliver water, firefighting foam, or flowing agent into the interior space of the aircraft solely using the power exerted through the hose stream. Once the hole has been created, retractable hooks, which may serve as a dogging mechanism, may latch the the hole saw nozzle 1000 to the hole of the aircraft, thereby allowing the user to retreat to a safe distance as the interior foaming takes place. The dogging mechanism may be actuated by a handle 400, allowing the hooks 320 (shown in FIGS. 10A and 10B) to rotate between a latched position and an unlatched position. Given that firefighting foam mixture supplied through the fire hose may not be aspirated into proper foam, embodiments of the hole saw nozzle 1000 may further comprise a turbulent water plate 152 (shown in FIGS. 4A and 4B) to create such foam.

Figure 4A:
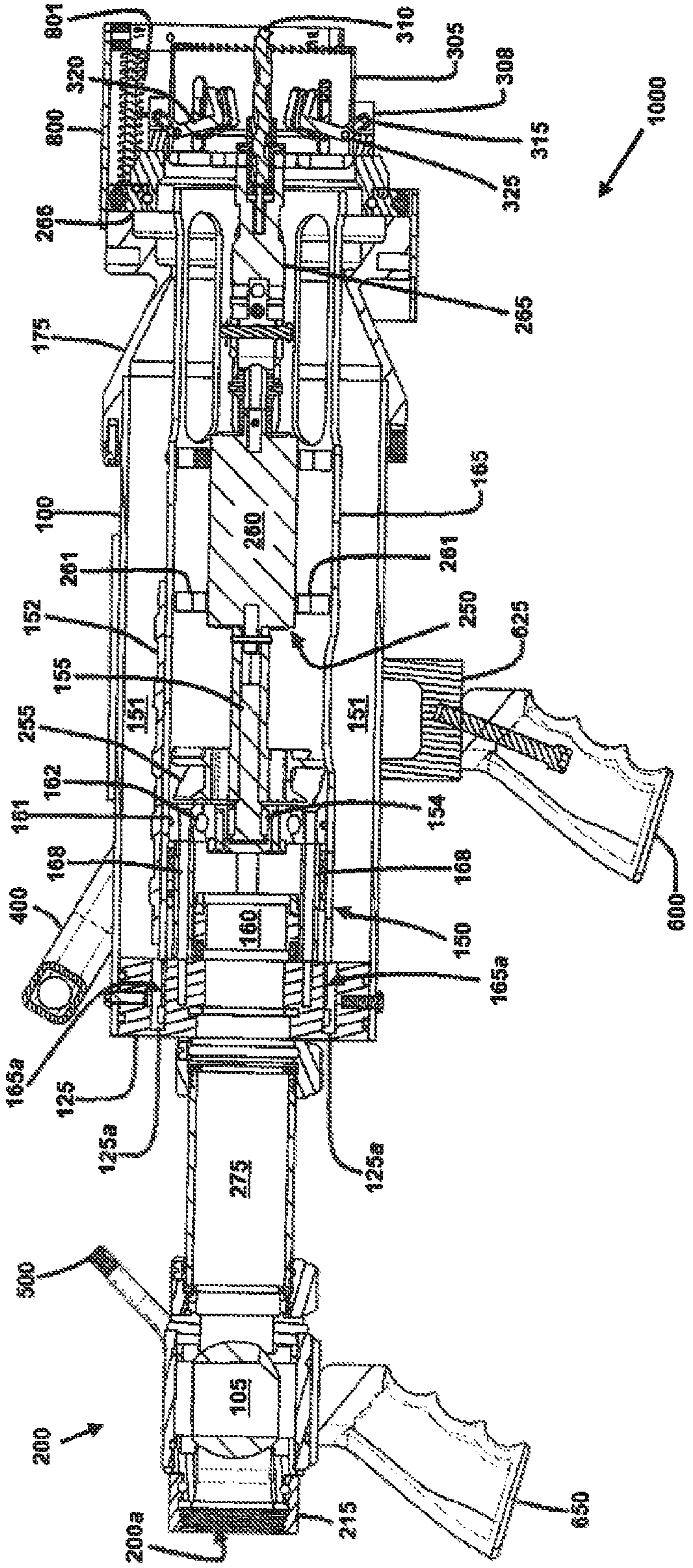
FIGS. 4A and 4B are illustrations of side cross section views of one embodiment of the hole saw breaching firefighting nozzle and show the hole saw assembly in the unlatched position and latched position, respectively.
Figure 4B:
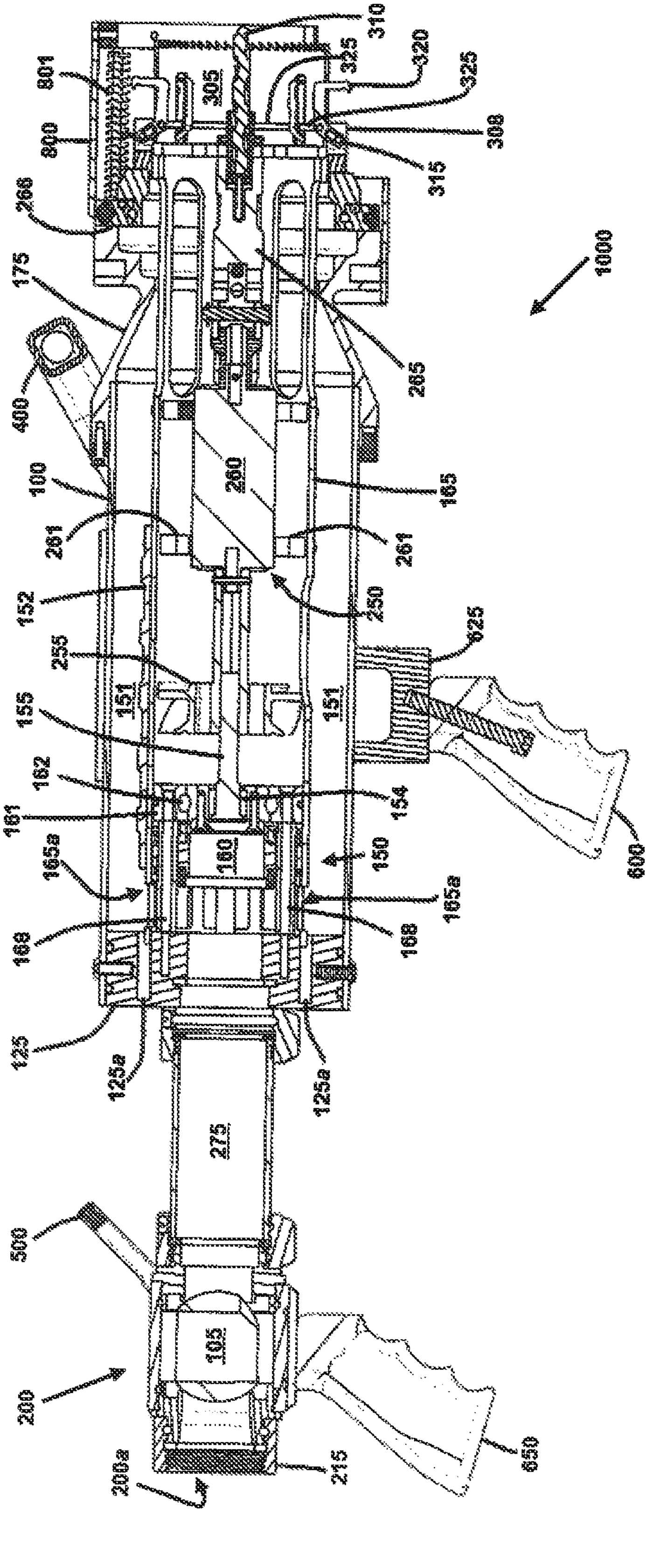

As shown in FIGS. 1A and 1B, one embodiment of the hole saw nozzle 1000 may comprise: an outer housing 100, ball shut-off 200, hose coupler 275, hole saw assembly 300, handle 400, ball (U) shut-off lever 500, pistol grips 600, 650, handle bars 700, and skirt 800. The outer housing 100 may be a bodily structure or enclosure that protects the internal components of the hole saw nozzle 1000 including an inner housing 165, diffuser assembly 150, and drivetrain assembly 250, all of which are shown in FIGS. 4A and 4B. The outer housing 100 may be constructed in various shapes (e.g., tubular or rectangular) with relatively high strength materials such as a metal or polymer (e.g., ultra high molecular weight polyethylene (UHMWPE)). In an exemplary embodiment the outer housing 100 is preferably constructed of composite material for weight reduction to assist in firefighting functions or transport.

Additionally, FIGS. 1A and 1B show that the outer housing 100 may have an upstream end 100*a* and a downstream end 100*b*. The upstream end 100*a* may include an end cap 125, which is preferably a component of the diffuser assembly 150, and the downstream end 1001*b* may comprise a flow reducer 175. The end cap 125 may be an end cover for the upstream end 100*a* of the outer housing 100 and preferably comprises a center opening 201 (shown in FIG. 3) configured to removeably couple or attach the ball shut-off 200 via the hose coupler 275. The flow reducer 175 may be a collar, ring, or similar structure adapted to rotatably couple or hold the hole saw assembly 300 and may be adapted to permit forward and rearward movement of the hole saw assembly 300 with respect to the outer housing 100 and flow reducer 175. Importantly, the opening at the downstream end of the flow reducer 175 may have a smaller diameter than the opening at the upstream end of the flow reducer 175, such that the flow reducer 175 may reduce the flow area of the hose stream of water, foam, or flowing agent traveling through the flow reducer 175. In this manner, the flow reducer 175 may speed up the hose stream due to a Bernoulli Effect.

The ball shut-off 200 may control fluid flow (especially to increase velocity) entering the enclosed chamber of the outer housing 100 via the hose coupler 275 and center opening 201 of the end cap 125. The hose coupler 275 may be a coupling device that mechanically interconnects the ball shut-off 200 to the outer housing 100. The ball shut-off 200 may comprise: a ball shut-off lever 500, swivel inlet 215, pistol grip 650, and ball valve 105 (shown in FIGS. 4A and 4B). The swivel inlet 215 may comprise a hose opening 200*a*, which may be an inlet configured to removably couple or attach various firefighting hoses to the hole saw nozzle 1000. For example, in one embodiment the hose opening 200*a* may have a diameter of approximately 1½ inches, which is generally the standard diameter for 1½" firefighting hoses. The ball valve 105 may be a one-way valve adapted to open and close via a circular or semi-circular structure. The ball shut-off lever 500 may be configured for fluid flow control of a stream of water or flowing foam agent into the outer housing 100 by actuating the ball valve 105 for flow control of the flowing agent. In this manner, fluid flow from the hose line may be controlled in one direction. The pistol grip 650 may be used for supporting the upstream end of the hole saw nozzle 1000.

The hole saw assembly 300 may be a cutting tool for creating substantially circular holes and is preferably rotatably coupled to the downstream end 100*b* of the outer housing 100. The hole saw assembly 300 generally comprises a hole saw 305, and various couplers and bearings that may be coupled to the flow reducer 175, including a stator assembly 266 (shown in FIGS. 4A and 4B). The hole saw 305 may be an annular-shaped saw blade having a rotary shell with a toothed edge such as carbide or diamond tipped teeth. The hole saw 305 may be configured to rotate via energy exerted from the hose stream via the drivetrain assembly 250, which generally comprises a turbine 255 and planetary gearbox 260, both shown in FIGS. 4A and 4B. Specifically, in an exemplary embodiment, the hole saw 305 may rotate via energy exerted from a 1½" fire hose stream directed from the ball shut-off 200, and the turbine 255 may be employed to actuate the planetary gearbox 260 with the necessary speed reduction ratio for the hole saw 305 to turn at approximately 200 to 400 rpm, as specified by the manufacturer for the carbide/diamond grit type. In order to reduce the hazardous exposure to the user, a latch or dogging mechanism may be utilized to lock the hole saw nozzle 1000 into the cut hole, thereby allowing the firefighting and cooling function of the hole saw nozzle 1000 to function unattended. A pilot bit 310 or small drill bit may be used to drill a guide hole for the larger circular hole created by the hole saw 305. The skirt 800 may cover at least a portion of the hole saw assembly 300 during cutting or penetration in order to provide splash protection to the user. In one embodiment, the skirt 800 may utilize a rigid cover (e.g., metal, polymer, or composite material) and biasing members 801 (e.g., springs), as shown in FIGS. 4A to 51B. In another embodiment, embodiments of the skirt 800 may utilize a rubber skirt that substantially covers at least a upper portion of the hole saw 305. In this manner, the skirt 800 may provide splash cover from the hole saw 305 during hole cutting by providing continuous contact against the bulkhead while directing a curtain of water or flowing agent downwards or sideways, away from the user. Additional details of the hole saw assembly 300 is described further below.

Handle 400, pistol grips 600, 650, and handle bars 700 are preferably structures designed for grasping, holding, and providing support to the hole saw nozzle 1000 during operation. Handle 400 is preferably used to actuate the latch functionality of the hole saw assembly 300 by actuating the hooks 320 (shown in FIGS. 4A and 4B) between latch and unlatched positions. Handle 400 may also be locked in either the fully rearward and fully forward positions via a locking mechanism. Handle bars 700 may provide lateral support to the user when utilizing the hole saw nozzle 1000 during operation. Pistol grip 600 may provide inline and leverage support for the hole saw assembly 300 and may be removable via a pistol grip coupler 625, which is preferably positioned beneath the outer housing 100. In other embodiments, the pistol grip 600 may be configured to pivot forward or rearward in order to serve as a strut when dogging the hole saw nozzle 1000 against a bulkhead.

During operation when a fire occurs within an aircraft, a user may approach the aircraft and proceed in cutting a hole at the airframe using the hole saw nozzle 1000. Specifically, the user may first create the hole by positioning the hole saw nozzle 1000, pilot bit 310 and hole saw 305 against the desired location of the aircraft (i.e., where the internal fire is located) and activate the stream of water or flowing agent by actuating the ball shut-off lever 500. Once activating the ball shut-off lever 500, the stream of water, foam, or flowing agent may actuate the pilot bit 310 and hole saw 305 by triggering the drivetrain assembly 250. The drivetrain assembly 250 is preferably operably coupled to the pilot bit 310, which can be used to create a guiding hole for cutting the larger hole with the hole saw 305. As the pilot bit 310 drills at the desired location, the hole saw 305 may then cut a larger circular hole surrounding the drill bit hole location.

Once a circular hole is created by the hole saw 305, the user may insert the hole saw nozzle 1000 into the cut hole in order to provide water, firefighting foam, or flowing agent to extinguish the fire source. Optionally, the hole saw nozzle 1000 may latch into the aircraft skin by utilizing the retractable hooks 320, which may serve as the dogging mechanism. In this manner, the user may leave the hole saw nozzle 1000 unattended and retreat to a safe distance. Pre-mixed foam solution may be aspirated by a turbulent water plate 152 and provided through the hole saw nozzle 1000. The (J) foam solutions expansion preferably fills at least a portion of the interior volume of the aircraft and may increase the firefighting foam volume by a factor of 5 to 10 times the water volume. Given that a typical 1½ " fire hose supplies 90 gpm (approximately 12 cfm), the addition of 60 to 80 cfM based on foaming created by the turbulent water plate 152, the total volume of the foam may become more than 70 cfm, thereby filling the void with foam that loiters in place for a considerable length of time. Given that hydrant pressure may be only available, the nozzle pressure may be approximately over 20 psi. Previous tests have shown the flow rate to be approximately 150 gpm. Thus, the hole saw nozzle 1000 may perform better with higher pressure and a flow rate of 250 gpm or higher.

Figure 2A:
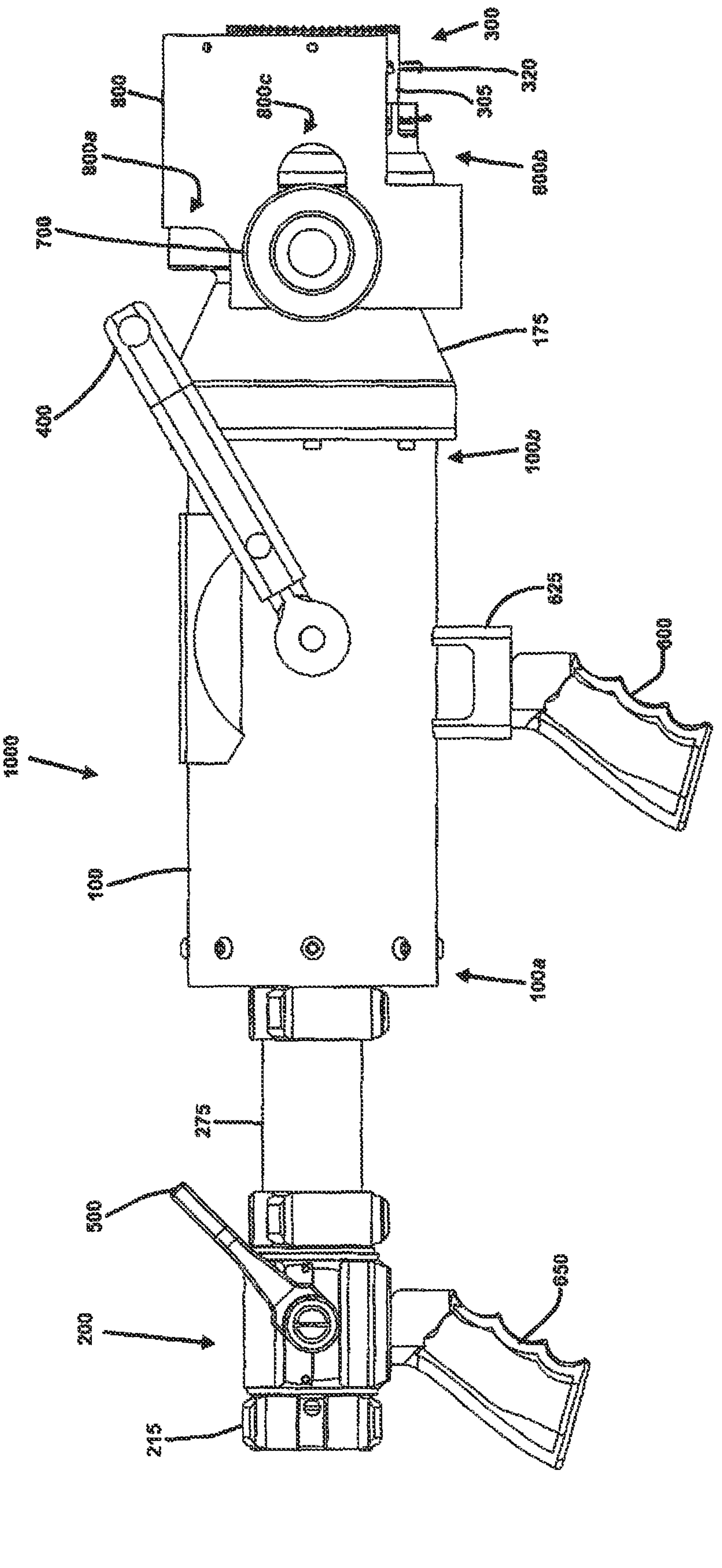
FIGS. 2A and B are illustrations of a side elevation and top plan views, respectively, of one embodiment of the hole saw breaching firefighting nozzle.
Figure 2B:
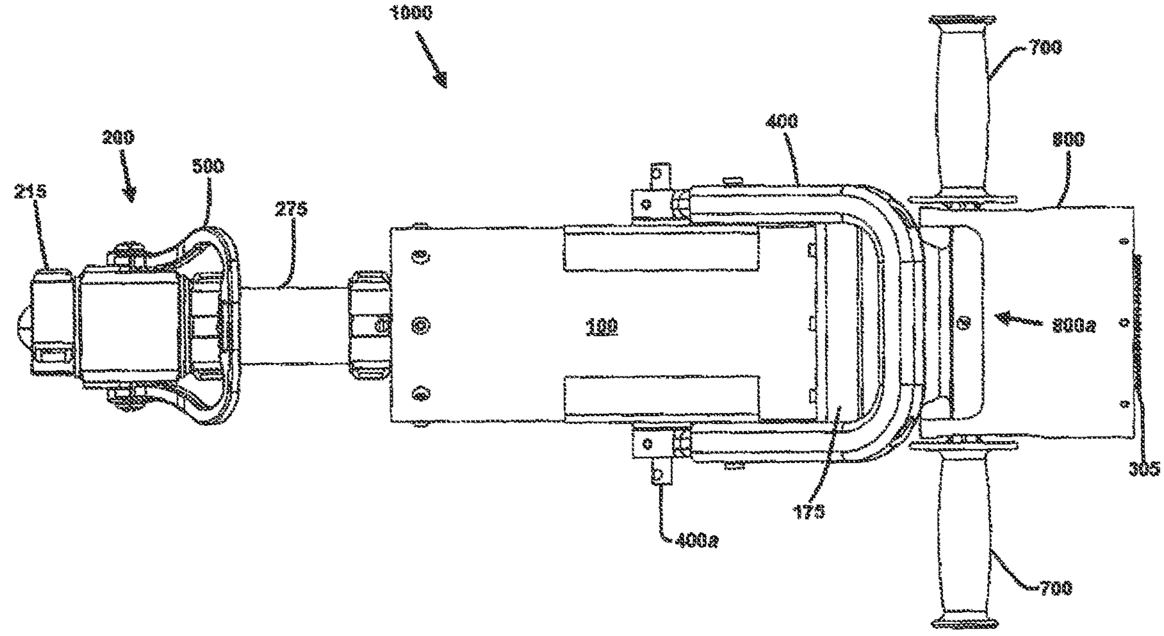

FIGS. 2A and 2B are illustrations of a side elevation and top plan views, respectively, of one embodiment of the hole saw nozzle 1000. As shown in FIGS. 2A and 2B, one embodiment of the hole saw nozzle 1000 may comprise: an outer housing 100, ball shut-off 200, hose coupler 275, hole saw assembly 300, handle 400, pistol grips 600, 650, pistol grip coupler 625, handle bars 700, and skirt 800. The outer housing 100 may comprise a flow reducer 175. The ball shut-off 200 may comprise a hose ball shut-off lever 500 and swivel inlet 215. The hole saw assembly 300 generally comprises a hole saw 305 and hooks 320.

Importantly, FIGS. 2A and 2B show the handle 400 transitioned to the forward position via pivot 400*a*. This may actuate hooks 320 within the hole saw assembly 300 to extend radially outward, thereby transitioning the hole saw assembly 300 into the latched position. As discussed above, the switching of the hole saw assembly 300 between the latched position and unlatched position may engage the dogging mechanism. In particular, the hole saw handle 400 may actuate the hooks 320 into the unlatched position when pulled rearward (shown in FIGS. 1A, 1B, and 4A) and into the latched position when moved forward (shown in FIGS. 2A and 4B). Thus, FIGS. 2A and 2B show the hooks 320 extended radially outward when the hole saw handle 400 is switched in the forward position. In some embodiments, the handle 400 may also be locked in either the fully rearward or fully forward positions via a locking mechanism.

Finally, FIGS. 2A and 2B show that the skirt 800 may comprise indentations 800*a*, 800*h* and slots 800*c*. Specifically, FIGS. 2A and 2B show indentation 800*a* positioned at the upstream end of the skirt 800, indentation 800*b* located beneath the skirt 800, and slots 800*c* laterally disposed around the bar handles 700. Given that an embodiment of the skirt 800 may comprise biasing members 801, indentation 800*a* and slots 800*c* are preferably designed to permit forward or rearward movement of the skirt 800 between a predetermined, original position and a compressed position. In this manner, when the skirt 800 is pressed against the wall or bulkhead of the aircraft, the skirt 800 may provide continuous contact to the aircraft, as the hole saw assembly 300 drills and penetrates the aircraft. Indentation 800*b* is preferably located beneath the skirt 800 to allow water or flowing agent to exit at the downstream end of the hole saw nozzle 1000 and away from the user.

Figure 3:
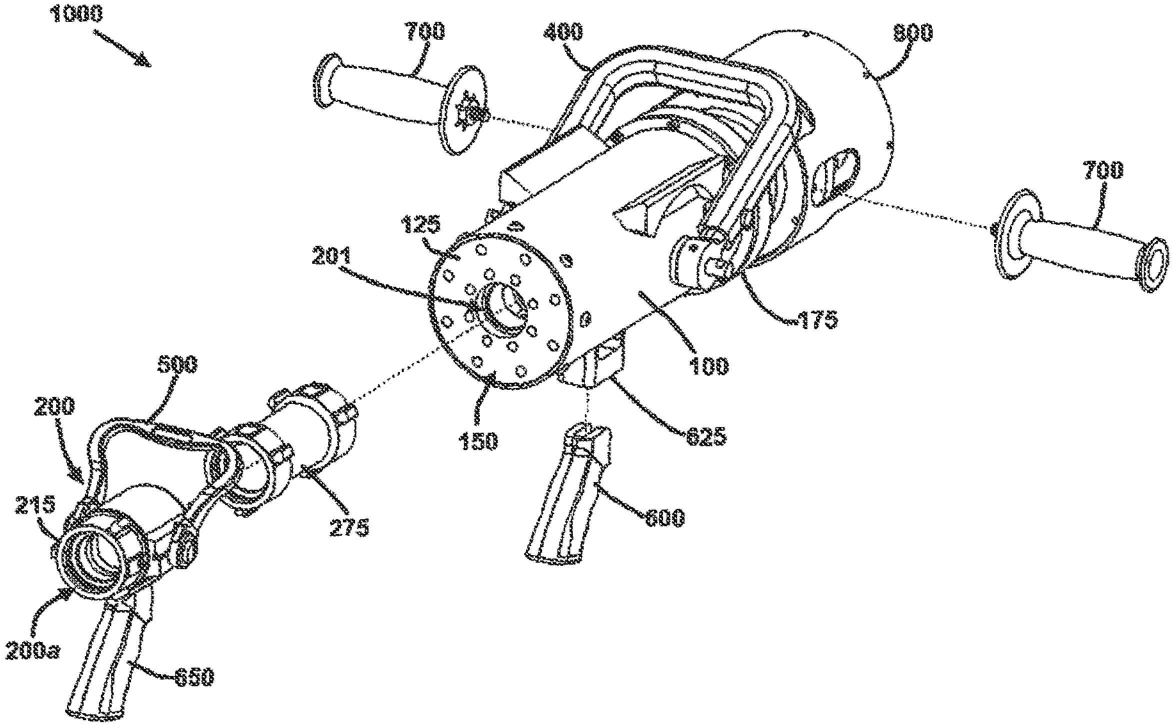
FIG. 3 is an illustration of an exploded, perspective view of one embodiment of a hole saw breaching firefighting nozzle.

FIG. 3 is an illustration of an exploded, perspective view of one embodiment of a hole saw nozzle 1000. As shown in FIG. 3, one embodiment of the hole saw nozzle 1000 may comprise: an outer housing 100, diffuser assembly 150, ball shut-off 200, hose coupler 275, handle 400, pistol grips 600, 650, pistol grip coupler 625, handle bars 700, and skirt 800. The outer housing 100 may comprise a flow reducer 175. The diffuser assembly 150 may comprise an end cap 125. The ball shut-off 200 may comprise a ball shut-off lever 500 and swivel inlet 215.

Importantly, FIG. 3 shows that components of the hole saw nozzle 1000 may be configured for repeated assembly and disassembly. Specifically, in one embodiment of the hole saw nozzle 1000, ball shut-off 200 may removably couple to the end cap 125 via the hose coupler 275; pistol grip 600 may removably couple to the outer housing 100 via the pistol grip coupler 625; and handle bars 700 may removably couple to the lateral sides of the outer housing 100. In this manner, components of the hole saw nozzle 1000 may be configured for repeated assembly and disassembly for ease of packaging and transport. Finally, FIG. 3 shows the center opening 201 of the end cap 125 located at the upstream end 100*a* of the outer housing 100.

FIGS. 4A and 4B are illustrations of side cross section views of one embodiment of the hole saw nozzle 1000 and show the hole saw assembly 300 in the unlatched position and latched position, respectively. Specifically, FIG. 4A depicts the hole saw assembly 300 in the unlatched position, whereas FIG. 4B depicts the hole saw assembly 300 in the latched position.

As shown in FIGS. 4A and 4B, one embodiment of the hole saw nozzle 1000 may comprise: an outer housing 100, inner housing 165, diffuser assembly 150, ball shut-off 200, hose coupler 275, drivetrain assembly 250, hole saw assembly 300, handle 400, pistol grip 600, and skirt 800. The ball shut-off 200 may comprise: a ball shut-off lever 500, ball valve 105, pistol grip 650, and swivel inlet 215. The hole saw assembly 300 may comprise a hole saw 305, dog crown 308, pilot bit 310, pins 315, hooks 320, and ring 325. The outer housing 100 may comprise a flow reducer 175.

Importantly, FIGS. 4A and 4B show the inner workings of the hole saw nozzle 1000, including the inner housing 165, diffuser assembly 150, and drivetrain assembly 250. The inner housing 165 is preferably a tubular cylinder that distributes or directs fluid flow within the outer housing 100. The inner housing 165 is preferably disposed within the outer housing 100 and in a sliding relationship with the end cap 125 and flow reducer 175. In particular, the inner housing 165 may slide forward or rearward via linear bearing shafts 168 located at the upstream end of the inner housing 165 and the flow reducer 175 located at the downstream end of the inner housing 165. The inner housing 165 may also be concentrically disposed and axially spaced within the outer housing 100 to create an annular flow region 151 surrounding the inner housing 165 but within the outer housing 100. The annular flow region 151 is preferably used to divert water, foam, or flowing agent from the ball shut-off 200 to the downstream end of the hole saw nozzle 1000 without actuating the drivetrain assembly 250 and hole saw assembly 300. The inner housing 165 may also comprise a turbulent water plate 152 surrounding at least a portion of the inner housing 165 to perform firefighting agent foaming.

FIGS. 4A and 41 also depict a diffuser assembly 150, which may comprise: an end cap 125, flow control ring 160, orifice plate 161, and linear bearing shafts 168. The orifice plate 161 is preferably a component configured to restrict flow of the hose stream and direct that flow to the drive train assembly 250. The orifice plate 161 may comprise: a plurality of orifices 162 disposed in a radial configuration and directed to the turbine 255. The orifice plate 161 is preferably disposed along the central longitudinal axis of the ball shut-off 200, outer housing 100, inner housing 165, and hole saw assembly 300 and is preferably disposed between the flow control ring 160 and drivetrain assembly 250. In this manner, the hose stream exiting the ball shut-off 200 may enter through the center opening **200*a* of the end cap 125 and towards the orifice plate 161. In various embodiments, the orifice plate 161 may also comprise a bushing 154 and shaft 155 to provide rotational stability to the drivetrain assembly 250, and in particular, the turbine 255 when a hose stream travels from the ball shut-off 200 to the orifice plate 161 and to the turbine 255 of the drivetrain assembly 250**.

The flow control ring 160 may be configured to control fluid flow communication between the orifice plate 161 and the annular flow region 151 surrounding the inner housing 165. The flow control ring 160 is preferably coupled to the upstream end of the inner housing 165 and may be disposed between the end cap 125 and orifice plate 161. Thus, depending on whether the inner housing 165 is in the forward or rearward position, the flow control ring 160 may likewise be either in the forward position (i.e., abutting against the orifice plate 161) or rearward position (i.e., abutting against the end cap 125). In this manner, the flow control ring 160 may either restrict or allow fluid to enter the orifice plate 161 or the annular flow region 151 surrounding the inner housing 165.

In particular, when the inner housing 165 is in the forward position, the flow control ring 160 is likewise preferably in the forward position and abutting the orifice plate 161. This preferably obstructs fluid from entering the orifice plate 161 but directs the fluid to exit gaps **165*a* located at the upstream end of the inner housing 165. In this manner, fluid may be directed to enter the annular flow region 151 surrounding the inner housing 165 and not the drivetrain assembly 250. On the other hand, when the inner housing 165 is in the rearward position, the flow control ring 160 is likewise (U) preferably in the rearward position and adjacent to the end cap 125. Thus, the flow control ring 160 is no longer adjacent to the orifice plate 161 and does not preferably obstruct the orifice plate 161**.

Importantly, the gaps **165*a* preferably move into an annular space 125*a* of the end cap 125 and is therefore preferably obstructed. As a result, fluid may enter only the orifice plate 161 and into the drivetrain assembly 250 (i.e., not into the annular flow region 151). Details of the control of fluid flow by the inner housing 165 and flow control ring 165** are discussed in more detail below.

Importantly, FIGS. 4A and 4B depict a drivetrain assembly 250 configured to deliver power to the hole saw assembly 300 based on the hose stream released by the ball shut-off 200. As shown in FIGS. 4A and 4B, one embodiment of the drivetrain assembly 250 may comprise: a turbine 255, planetary gearbox 260, and mandrel 265. The turbine 255 may be disposed within the inner housing 165 and operably coupled at the upstream end of the drivetrain assembly 250. Thus, as the turbine 255 rotates, the planetary gearbox 260 and mandrel 265 likewise rotate. The turbine 255 may also be rotatably coupled to the orifice plate 161 via the shaft 155 and bushing 154 for rotational stability. In one embodiment, the turbine 255 may be in a sliding relationship with the shaft 155, such that when the inner housing 165 and drivetrain assembly 250 move forward or rearward, the turbine 255 may likewise slide forward and rearward without causing forward or rearward movement to the shaft 155. The turbine 255 may be in fluid communication with the orifice plate 161 and operably coupled to the planetary gearbox 260. This may permit the turbine 255 to utilize the power exerted by the hose stream exiting the orifice plate 161 in order to create a rotational force, and thereby actuate the planetary gearbox 260. Additional details of the turbine 255 is described further below.

The planetary gearbox 260 may be a gear system having aligned input and the output shafts and configured to transfer the largest torque or torque density in compact form. The planetary gearbox 260 may comprise one or more outer, or planet, gears or pinions, revolving about a central sun gear or sun wheel, and the planet gears are typically mounted on a movable arm or carrier, which itself may rotate relative to the sun gear.

In various embodiments, the planetary gearbox 260 may reduce the rpm of the hole saw assembly 300 and increase the available torque, thereby improving the cutting performance. The fluid pressure required for adequate torque, however, typically remains in the 120 psi range while the pressure available is often in the 70 psi range. As a result, the planetary gearbox 260 utilizing the water-powered turbine 255 may be capable of supplying over 2 horsepower at 70 psi and delivering over 90 gpm. Exemplary embodiments of the hole saw nozzle 1000 preferably will flow greater than 200 gpm, thereby delivering several horsepower.

Embodiments of the planetary gearbox 260 may be operably coupled and disposed between the mandrel 265 and turbine 255 and may have various reduction ratios that correspond with turbines of various sizes. Preferably, exemplary embodiments of the planetary gearbox 260 may have a reduction ratio between 9:1 and 25:1. For example, in one embodiment, the planetary gearbox 260 may have a reduction ratio of 10:1, which may increase the speed of the hole saw assembly 300. In another embodiment, the planetary gearbox 260 may have a reduction ratio of 16:1 and operably coupled to a large turbine wheel. In a different embodiment, the planetary gearbox 260 may have a reduction ratio of 20:1 driven by a smaller diameter turbine wheel. In an exemplary embodiment, the planetary gearbox 260 may drive the hole saw assembly 300 approximately 5% of the rpm of the turbine 255 and thus may provide a 20 fold torque multiplication. Thus, the hole saw assembly 300 may rotate at approximately 200 to 400 rpm, depending on the pressure of the supplied hose stream and flow rate. As such, the reduction ratio of the planetary gearbox 260 may be determined based on the loaded RPM of the turbine 255 and the optimal cutting rpm of the hole saw assembly 300.

The mandrel 265 may be a cylindrical axle, spindle, shaft, or bar that operably couples the hole saw 305 to the planetary gearbox 260. Additional couplers and bearings may also be utilized to help transmit power from the turbine 255 and planetary gearbox 260 to the hole saw assembly 300 such as a stator assembly 266. Here, the stator assembly 266 may be rotatably coupled between the flow reducer 175 and hole saw assembly 300.

FIGS. 4A and 4B also depict details of the hole saw assembly 300. As discussed above, the hole saw assembly 300 may be configured to cut a circular hole on an wall or bulkhead and may utilize a retractable dogging mechanism that latches onto the hole in order to restrict movement of the hole saw nozzle 1000. Specifically, the hole saw assembly 300 may hold the hole saw nozzle 1000 in place by engaging the hole saw nozzle 1000 to the newly created hole via hooks 320, thereby obstructing movement of the hole saw nozzle 1000. The hooks 320 may pivot against edges of the hole when at least a portion of the hole saw nozzle 1000 is inserted through the hole, As shown in 4A and 4B, one embodiment of the hole saw assembly 300 may comprise: a hole saw 305, dog crown 308, pins 315, hooks 320, and ring 325. The hole saw 305 may be a tool for cutting circular holes and may comprise metal cylinder with a toothed edge such as bride teeth. In one embodiment, the hole saw 305 may be manufactured by Zoro Tools (Morse ATCG48 (carbide grit) or AT48 (carbide teeth) with a M45PCT arbor. The carbide teeth may be suitable for wood/aluminum drilling or composite drilling.

The dog crown 308, pins 315, hooks 320, and ring 325 may altogether form the retractable dogging mechanism for latching the hole saw nozzle 1000 to the newly created hole. Specifically, portions of each hook 320 may be rotatably coupled to the dog crown 308 and ring 325, which may permit the hooks 320 to rotate between latched and unlatched positions. In particular, the hole saw 305 may be disposed within the dog crown 308, such that when the hole saw 305 slides forward or rearward relative to the dog crown 308, the hooks 320 may rotate between the latched and unlatched positions, respectively.

In various embodiments, the hooks 320 may be actuated between the latched and unlatched positions by various mechanisms. For example, in an exemplary embodiment shown in FIGS. 1A to 5B, actuation of the hooks 320 may be performed via movement of the handle 400 by pivoting the hole saw handle 400 forward or rearward via pivot 400*a*. Alternatively, in other embodiments, retracting the hooks 320 may be performed by pivoting other parts of the hole saw nozzle 1000 forward or rearward such as the pistol grip 600 or outer housing 100. Additional details about the dogging mechanism are described further below.

Figure 5A:
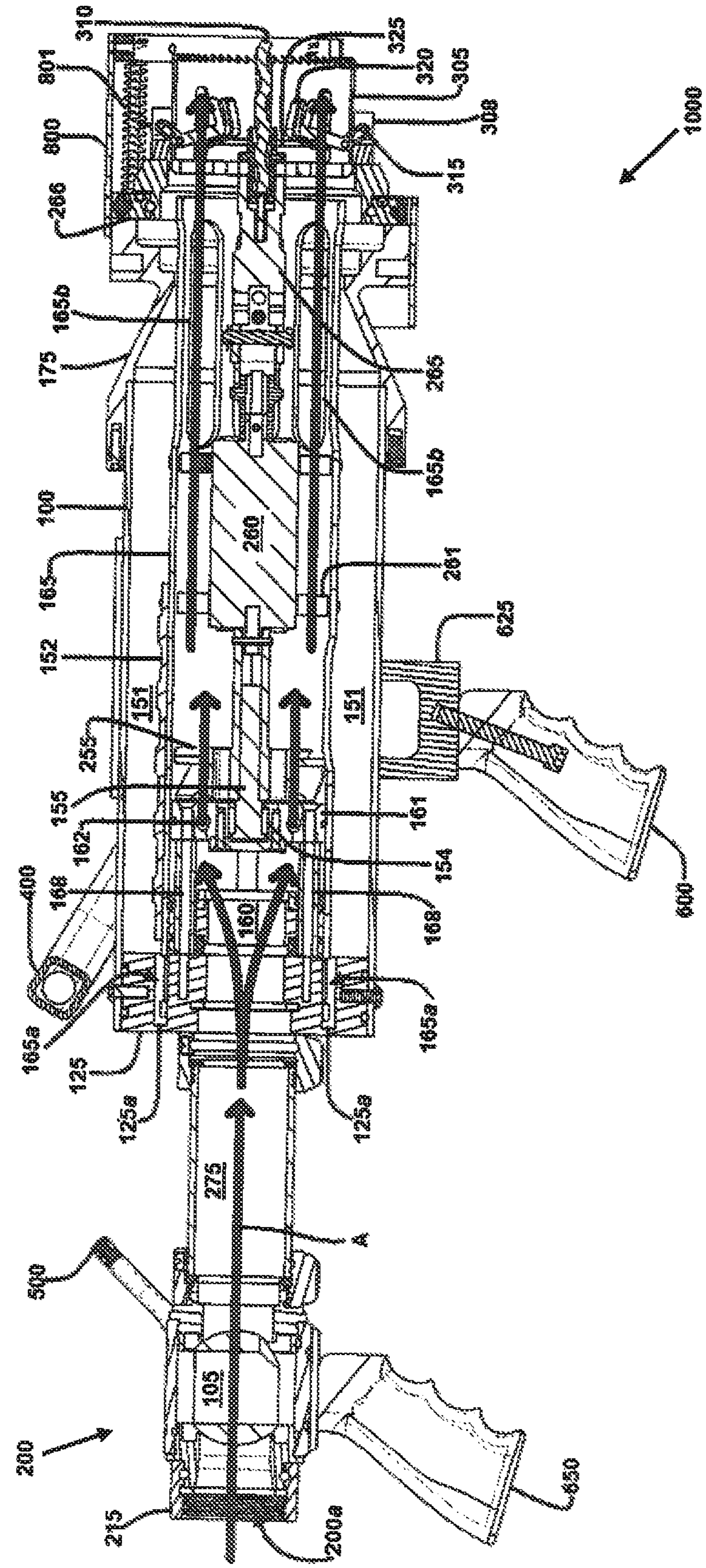
FIGS. 5A and 5B are illustrations of side cross section views of one embodiment of the hole saw breaching firefighting nozzle and show how fluid flows when the hole saw assembly in the unlatched position and latched position, respectively.
Figure 5B:
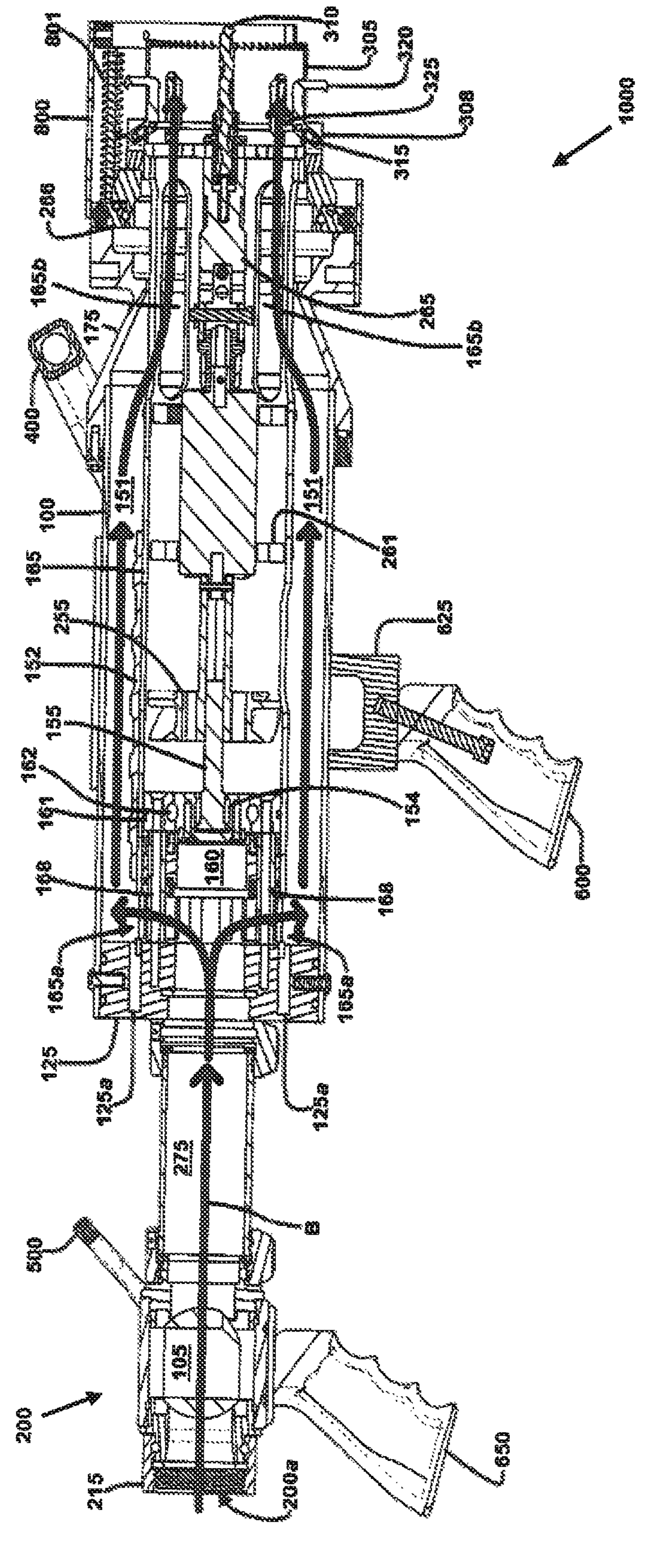

FIGS. 5A and 5B are illustrations of side cross section views of one embodiment of the hole saw nozzle 1000 and show how fluid flows when the hole saw assembly 300 is in the unlatched position and latched position, respectively. Specifically, FIG. 5A shows how fluid flows when the hole saw assembly 300 in the unlatched position, whereas FIG. 5B shows how fluid flows when the hole saw assembly 300 in the latched position.

Regarding FIG. 5A, when the handle 400 is shifted in the rearward position, the hole saw assembly 300 is preferably in the unlatched position (i.e., hooks 320 are retracted inwards towards the central longitudinal axis of the hole saw assembly 300). Here, the handle 400 preferably moves the inner housing 165 rearwards or upstream, thereby moving the flow control ring 160 rearwards and away from the orifice plate 161. Additionally, the gaps 165*a* of the inner housing 165 preferably move within the annular space 125*a* of the end cap 125 and are preferably obstructed. As a result, fluid A flowing and entering the ball shut-off 200, hose coupler 275 and into the outer housing 100 via the center opening 201 of the end cap 125 is directed to enter the orifice plate 161 but is preferably unable to enter the annular flow region 151. Thus, the fluid A preferably enters the orifice plate 161 and is distributed through the turbine wheel 255. This may actuate the drivetrain assembly 250 by rotating the turbine wheel 255 and planetary gearbox 260. Actuation of the planetary gearbox 260 may then rotate the mandrel 265 and ultimately the hole saw 305. Preferably, an increase in torque occurs due to the reduction ratio of the planetary gearbox 260. Notably, fluid A flows primarily through the inner housing 165 to actuate the drivetrain assembly 250 and not through the annular flow region 151.

Turning to FIG. 5B, when the handle 400 is shifted in the forward position, the hole saw assembly 300 is preferably in the latched position (i.e., hooks 320 are extended outwardly and radially away from central longitudinal axis of the hole saw assembly 300). Here, the handle 400 preferably moves the inner housing 165 forward or downstream, thereby moving the flow control ring 160 forward and exposing the gaps 165*a* located at the upstream end of the inner housing 165. As a result, fluid B flowing and entering the ball shut-off 200, hose coupler 275 and into the outer housing 100 via the center opening 201 of the end cap 125 is restricted from traveling through the orifices 162 of the orifice plate 161 but is directed to flow into the annular flow region 151 via the gaps 165*a* of the inner housing 165. As a result, fluid B does not actuate the drivetrain assembly 250 and hole saw 305. Rather, fluid B flows primarily through the annular flow region 151, through the downstream portion of the inner housing 165 via openings 165*b* and ultimately through the hole saw assembly 300 without actuating the hole saw 305. In this manner, handle 400 may also serve as a brake for the cutting function of the hole saw assembly 300.

Figure 6:
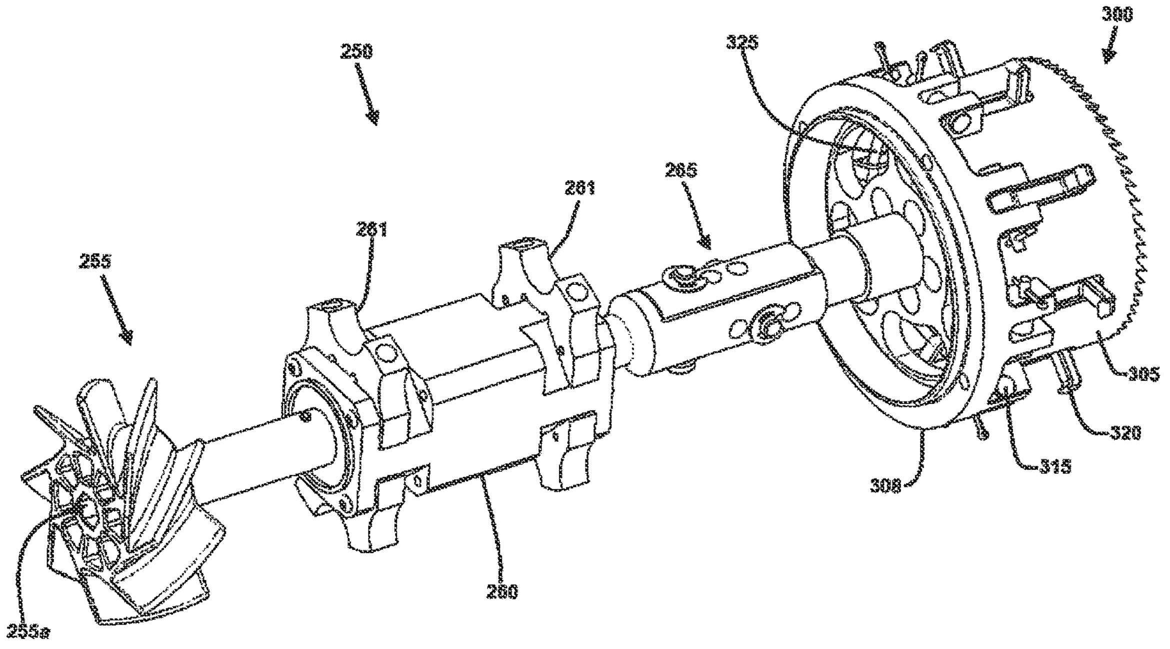
FIG. 6 is an illustration of a perspective view of one embodiment of the hole saw assembly operably coupled to an embodiment of the drivetrain assembly.

FIG. 6 is an illustration of a perspective view of one embodiment of the hole saw assembly 300 operably coupled to an embodiment of the drivetrain assembly 250. As shown in FIG. 6, one embodiment of the drivetrain assembly 250 may comprise: a turbine 255, planetary gearbox 260, and mandrel 265. One embodiment of the hole saw assembly 300 may comprise: a hole saw 305, dog crown 308, pins 315, hooks 320, and ring 325. Here, FIG. 6 shows that the hole saw assembly 300 may be coupled to the downstream end of the drivetrain assembly 250 via the mandrel 265. FIG. 6 also depicts the planetary gearbox 260 having support structures 261 that may be used to fasten the drivetrain assembly 250 to the inner housing 165. In this manner, forward and rearward movement of the inner housing 165 may likewise cause forward and rearward movement of the drivetrain assembly 250. Turbine bore 255*a* may engage with shaft 155 and may allow the turbine 255 to slide forward and rearward without causing forward and rearward movement of the shaft 155.

Figure 7:
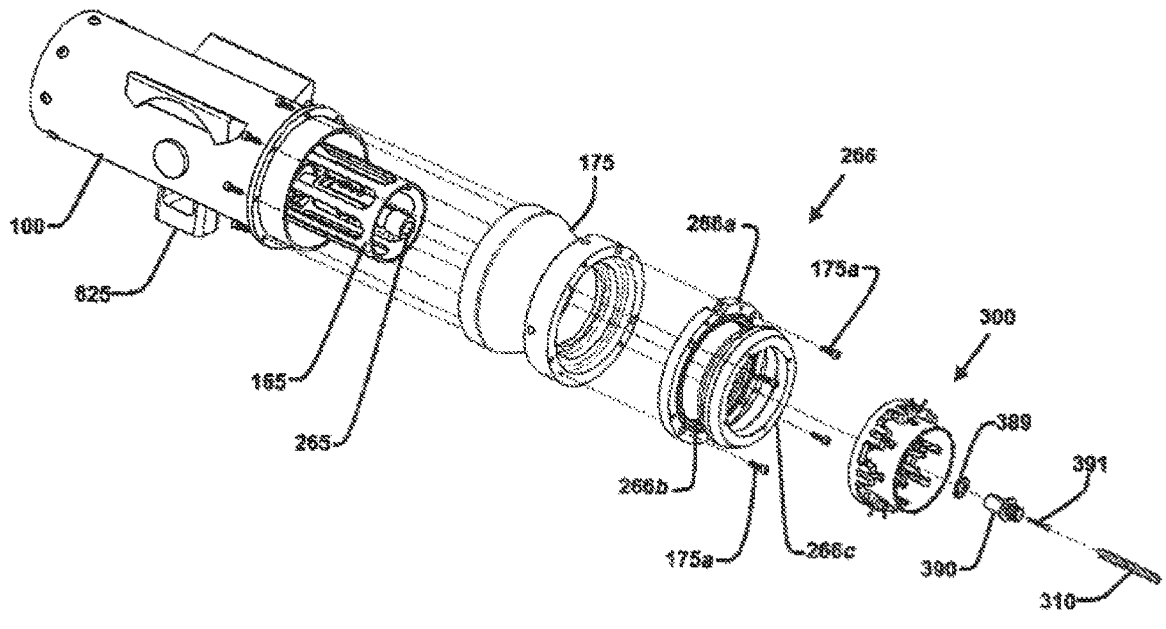
FIG. 7 is an illustration of an exploded view of embodiments of the hole saw assembly and stator assembly and shows how the hole saw assembly is coupled to the flow reducer and mandrel.

FIG. 7 is an illustration of an exploded view of embodiments of the hole saw assembly 300 and stator assembly 266 and shows how the hole saw assembly 300 is coupled to the flow reducer 175 and mandrel 265. As shown in FIG. 7, one embodiment of the stator assembly 266 may comprise a stator 266*a*, bearings 266*b*, and rotating collar 266*c*. The stator assembly 266 may be a rotary bearing or thrust bearing that permits rotation of the hole saw assembly 300 and may provide an axial load when utilizing the cutting function of the hole saw assembly 300. The stator assembly 266 may also provide rotational support to the hole saw assembly 300 by coupling the hole saw assembly 300 to the flow reducer 175. Specifically, stator 266*a* may be coupled to the flow reducer 175 via screw fasteners 175*a* while rotating collar 266*c* may couple to the dog crown 308 of the hole saw assembly 300. Bearings 266*b* may be disposed between the stator 266*a* and rotating collar 266*c* to provide rotational motion while reducing friction during rotation. Finally, FIG. 7 shows that one embodiment of the pilot bit 310 may couple to the hole saw assembly 300 via washer 389, chuck arbor 390, and screw fastener 391. The chuck arbor 390 may be operably coupled to the mandrel 265 via screw fastener 391 and washer 389.

Figure 8:
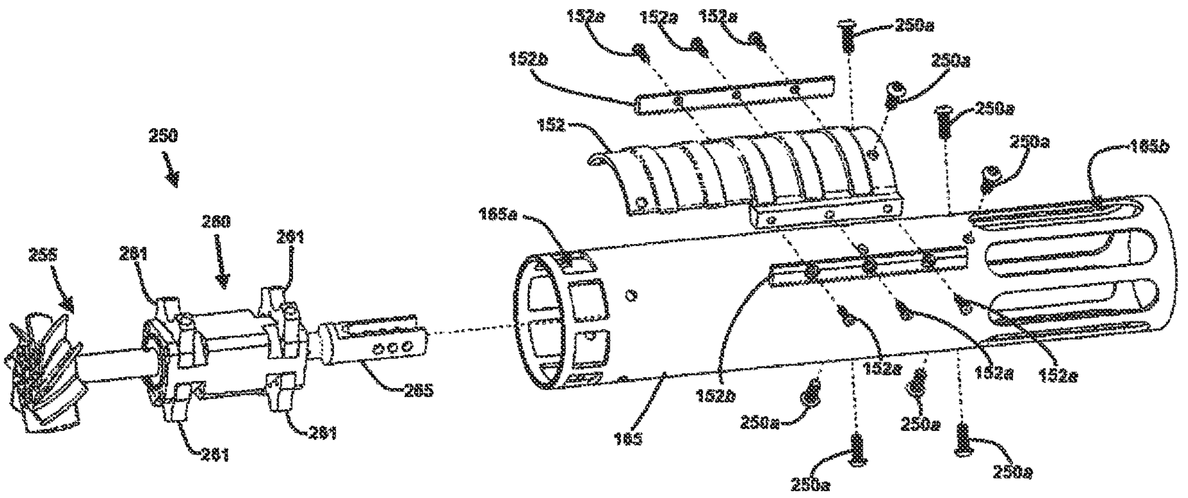
FIG. 8 is an illustration of a perspective view of embodiments of the drive train assembly separated from the inner housing.

FIG.8 is an illustration of a perspective view of embodiments of the drive train assembly 250 separated from the inner housing 165. As shown in FIG. 8, one embodiment of the drivetrain assembly 250 may comprise: a turbine 255, planetary gearbox 260, and mandrel 265. One embodiment of the inner housing 165 may comprise a turbulent water plate 152, screws 152*a*, and nut strips 152*b*. As discussed above, the turbulent water plate 152 is preferably configured to create turbulent flow of the firefighting foam in order to aspirate the foam solution. The turbulent water plate 152 may couple to the inner housing 165 via screws 152*a* and nut strips 152*b*. Importantly, FIG. 8 shows that the drivetrain assembly 250 may fasten into the inner housing 165 via screws 250*a*, which fasten the support structures 261 of the drivetrain assembly 250 into the inner housing 165. In this manner, the drivetrain assembly 250 may be substantially disposed within the inner housing 165.

Figure 9:
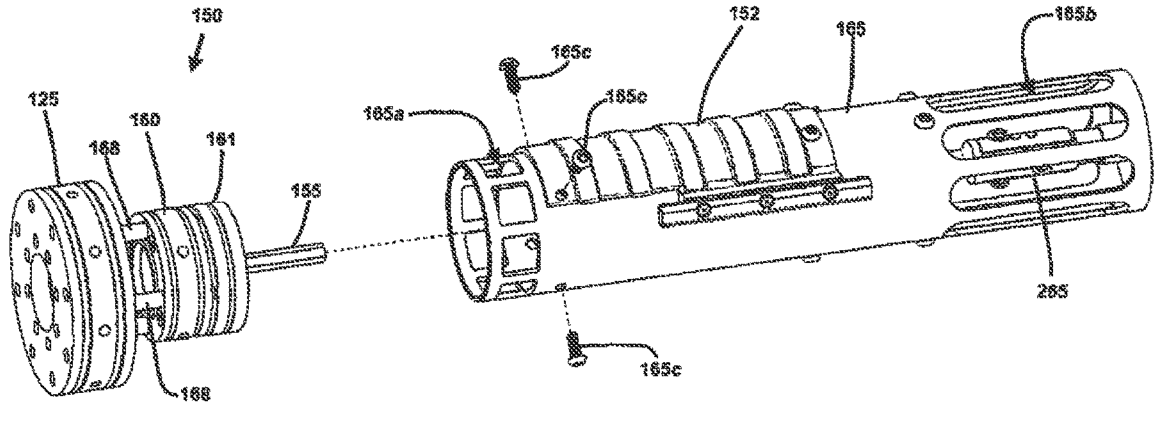
FIG. 9 is an illustration of a perspective view of embodiments of the diffuser assembly (U) separated from the inner housing and drivetrain assembly.

FIG. 9 is an illustration of a perspective view of embodiments of the diffuser assembly separated from the inner housing and drivetrain assembly. As shown in FIG. 9, one embodiment of the diffuser assembly 150 may comprise: the end cap 125, flow control ring 160, orifice plate 161, linear bearing shafts 168, and shaft 155. The flow control ring 160 may be disposed between the end cap 125 and orifice plate 161 and may be fastened to the inner housing 165 via set screws 165*c*. The shaft 155 may be rotatably coupled to the orifice plate 161, and the drivetrain assembly 250 may be in a rotating and sliding relationship with shaft 155. Upon fastening the flow control ring 160 to the inner housing 165, the inner housing 165 and flow control ring 160 may move forward and rearward with respect to the end cap 125, orifice plate 161, and shaft 155 via linear bearing shafts 168.

In particular, when the inner housing 165 is in the forward position, the flow control ring 160 is likewise preferably in the forward position and abutting the orifice plate 161 (shown in FIG. 4B). This preferably obstructs fluid from entering the orifice plate 161 but directs the fluid to exit gaps 165*a* located at the upstream end of the inner housing 165. In this manner, fluid may be directed to enter the annular flow region 151 surrounding the inner housing 165 and not the drivetrain assembly 250. From the annular flow region 151, the fluid may then travel through the downstream end of the inner housing 165 via openings 165*b*. On the other hand, when the inner housing 165 is in the rearward position, the flow control ring 160 is likewise preferably in the rearward position and adjacent to the end cap 125. Thus, the flow control ring 160 is no longer adjacent to the orifice plate 161 and does not preferably obstruct the orifice plate 161. Rather, the gaps 165*a* preferably move within an annular space 125*a* of the end cap 125. As a result, fluid may only travel through the orifice plate 161 and into the drivetrain assembly 250 (i.e., not into the annular flow region 151). In this manner, the flow control ring 160 may control the fluid flow communication between the orifice plate 161 and annular flow region 151 surrounding the inner housing 165.

Figure 10A:
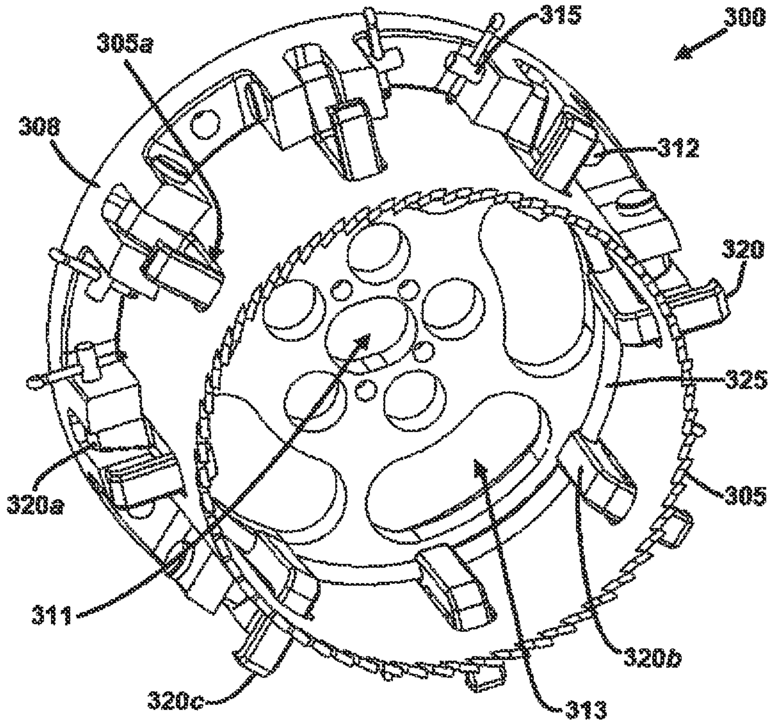
FIGS. 10A and 10B are illustrations of perspective views of one embodiment of the hole saw assembly and show the hole saw assembly in the latched position and an unlatched position, respectively.
Figure 10B:
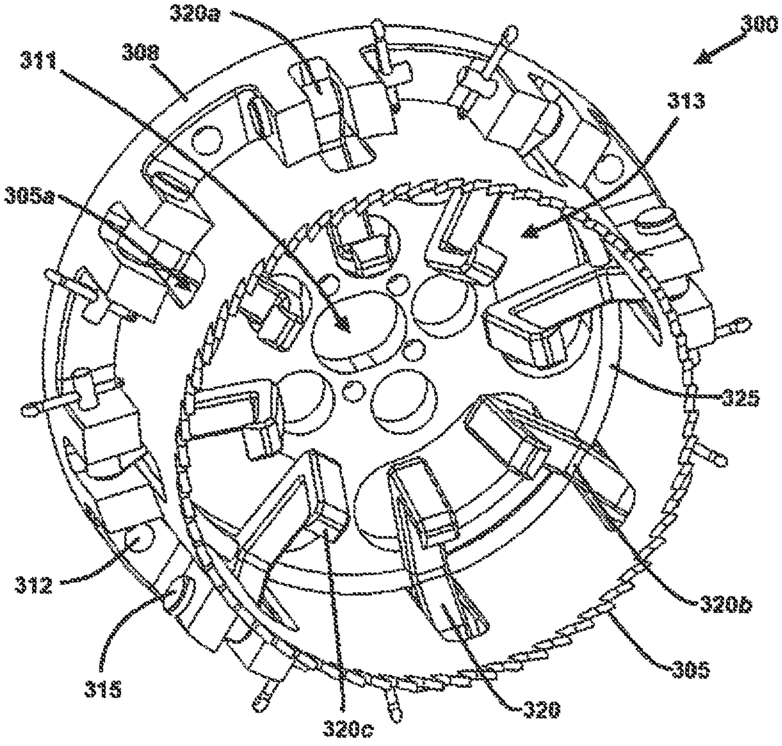

FIGS. 10A and 10B are illustrations of perspective views of one embodiment of the hole saw assembly 300 and show the hole saw assembly 300 in the latched position and an unlatched position, respectively. Specifically, FIG. 10A shows the hole saw assembly 300 with the hooks 320 in the latched position, whereas FIG. 10B shows the hole saw assembly 300 with the hooks 320 in the unlatched position. As discussed above, the hole saw assembly 300 may also utilize a retractable dogging mechanism or tool that prevents or restricts movement of hole saw nozzle 1000 when locked or latched to the hole. Specifically, the hole saw assembly 300 may hold the hole saw nozzle 1000 in place by engaging the hole saw nozzle 10 to the newly created hole via hooks 320, thereby obstructing movement of the hole saw nozzle 1000. The hooks 320 may be pivoted against edges of the hole when at least a portion of the forward or downstream end of the hole saw nozzle 1000 is inserted through the hole.

As shown in FIGS. 10A and 10B, one embodiment of the hole saw assembly 300 may comprise: a hole saw 305, dog crown 308, pins 315, hooks 320, and ring 325, wherein each hook 320 may have a base end 320*a*, mid portion 320*b*, and hook end 320*c*. The hole saw 305 preferably comprises slots 305*a* or openings adapted for pivotal movement of the hooks 320, and portions of each hook 320 is preferably pivotally engaged with either the dog crown 308 or ring 325.

Specifically, FIGS. 10A and 10B show that the base ends 320*a* of each hook 320 may be rotatably coupled to the dog crown 308 and the mid portions 320*b* of each hook 320 may be rotatably coupled to the ring 325, which is preferably disposed within the hole saw 305. In this manner, the hooks 320 may be locked into the hole saw 305 but may rotate between the latched and unlatched positions. Given that the mid portion 320*b* of the hooks 320 engaged with the ring 325 within the hole saw 305. The ring 325 may cause the hooks 320 to rotate altogether between the latched and unlatched positions. Additionally, the hole saw 305 may be disposed within the dog crown 308, such that when the hole saw 305 slides forward or rearward relative to the dog crown 308, the hooks 320 may rotate between the latched position and an unlatched position, respectively. The angular shape of the based ends 320*a* of the hooks 320 may also be configured for repetitive latched and unlatched movements of the hooks 320 when the hole saw 305 slides forward and rearward with respect to the dog crown 308.

Opening 311 may be used to couple the hole saw 305 and pilot bit 310 to the mandrel 265 via washer 389, chuck arbor 390, and screw fastener 391. Openings 312 may be used to fasten the dog crown 308 to the stator assembly 266 (i.e., rotating collar 266*c*) via screw fasteners. Openings 313 may be used to allowing water, foam, or flowing agent to exit the hole saw nozzle 1000.

In various embodiments, the retractable dogging assembly 300 may be actuated between the latched and unlatched positions by various mechanisms. For example, in an exemplary embodiment, actuation of the hooks 320 may be performed via movement of the handle 400 by pivoting the handle 400 forward or rearward. Alternatively, in other embodiments, retracting the hooks 320 may be performed by pivoting other parts of the hole saw nozzle 1000 forward or rearward such as the pistol grip 600 or outer housing 100.

Figure 11:
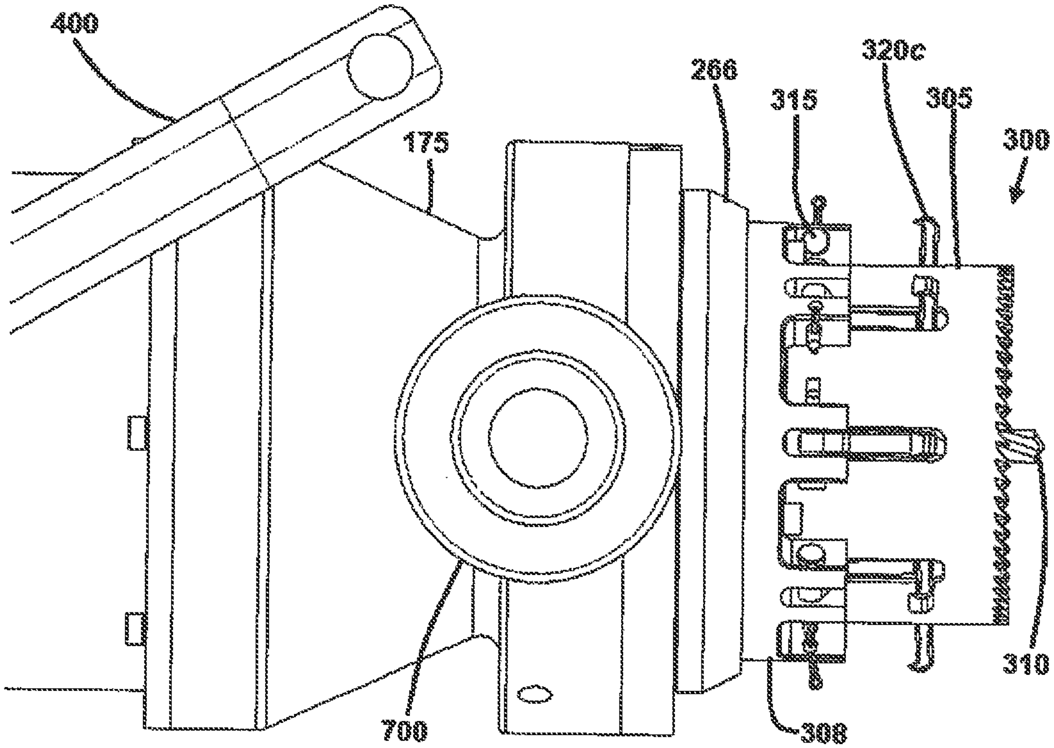

FIG. 11 is an illustration of a side elevation view of one embodiment of a downstream end of the hole saw nozzle 10 without the skirt 800 and shows the hole saw assembly 300 in the latched position. As shown in FIG. 11, one embodiment of the hole saw nozzle 1000 may comprise: an outer housing 100, flow reducer 175, stator assembly 266, handle 400, and hole saw assembly 300, wherein the hole saw assembly 300 may comprise: a hole saw 305, dog crown 308, pins 315, and hooks 320. Importantly, FIG. 11 shows how hook end 320*c* of the hooks 320 protrude or extend radially outside the hole saw 305 when the hooks are in the latched position.

Figure 12A:
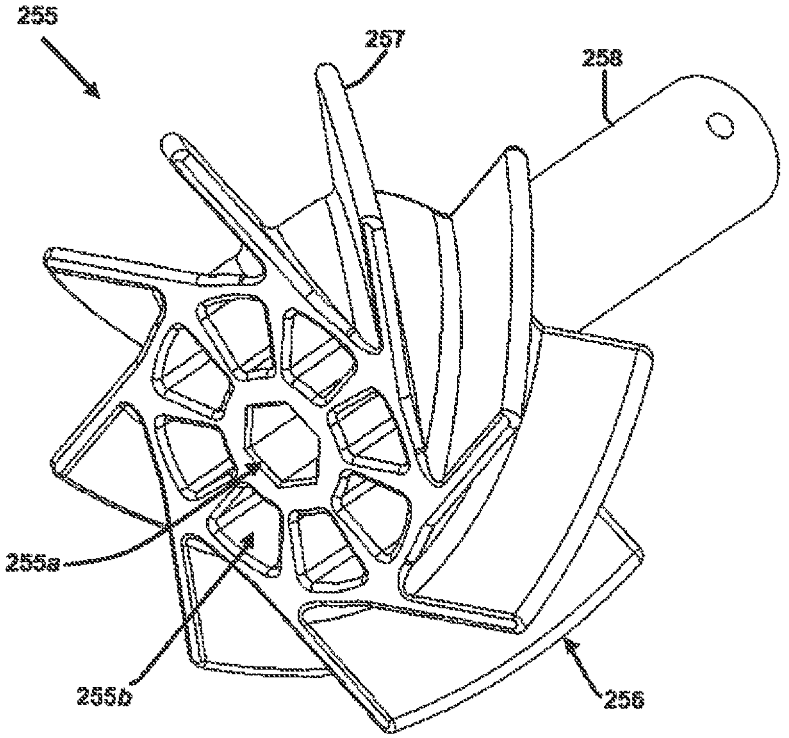
FIGS. 12A to 12C are illustrations of a perspective, front elevation, and top plan views, respectively, of one embodiment of a turbine.
Figure 12B:
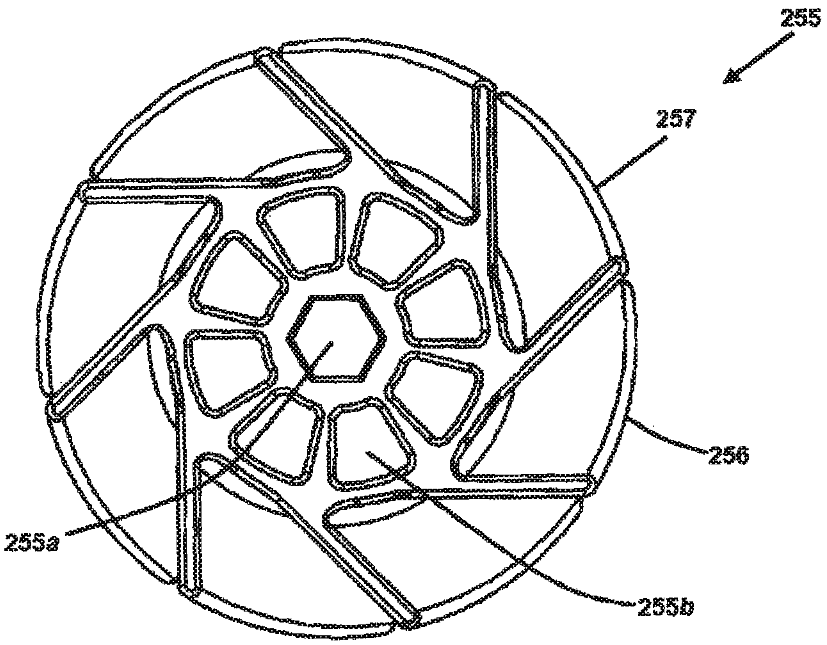
Figure 12C:
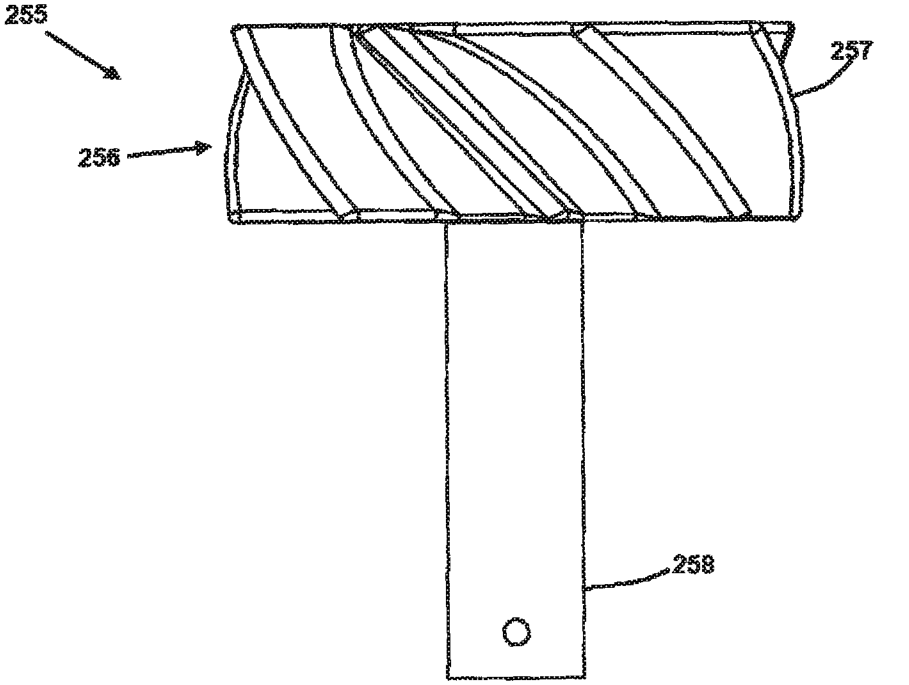

FIGS. 12A to 12C are illustrations of a perspective, front elevation, and top plan views, respectively, of one embodiment of a turbine 255. As shown in FIGS. 12A to 12C, one embodiment of the turbine 255 may comprise turbine wheel 256, fins 257, turbine shaft 258, turbine bore 255*a*, and openings 255*b*. As discussed above, the turbine wheel 256 may utilize the power exerted by the hose stream, FIGS. 12A to 12C show that an exemplary embodiment of the fins 257 may utilize a substantially straight profile, which may help reduce flow resistance through the turbine 255. Other embodiments of the fins 257, however, may utilized a curved profile in varying degrees. As the liquid or fluid flows through the fins 257, the turbine wheel 256 may rotate, thereby driving the turbine shaft 258 of the drivetrain assembly 250. This may in turn actuate the planetary gearbox 260, mandrel 265, and ultimately the hole saw assembly 300. Turbine bore 255*a* may engage with shaft 155 and may allow the turbine 255 to slide forward and rearward without causing forward and rearward movement of the shaft 155. Openings 255*b* may permit fluid to pass the turbine wheel 256 without obstruction.

In other embodiments, the turbine 255 may be a scroll turbine utilizing the power exerted by the hose stream. Based on conventional 70 psi and 90 gpm measurements from a standard 1½" fire hose, the power available may be approximately 2.2 hp (i.e., 1.6 kw). The rpm exhibited by the turbine may also be between approximately 2000 and 3500, depending on the configuration of the scroll turbine, water flow rate, and pressure. Importantly, embodiments of the planetary gearbox 260 output speed of may exhibit an output speed (i.e., speed of the hole saw 305) between 200-400 rpm.

In an exemplary embodiment, the fins 257 may have an angle between approximately 38° to 52° degrees radially with respect to the turbine wheel 256, but in an exemplary embodiment, the fins 257 may have an angle of approximately 45°, as shown in FIGS. 12A to 12C.

Other embodiments of the hole saw nozzle may comprise other components, which are not shown herein. For example, it is contemplated that other embodiments of the hole saw nozzle may comprise a clutch or device for coupling and disconnecting the planetary gearbox 260 with the turbine 255. The clutch may be operably coupled and disposed between the turbine 255 and planetary gearbox 260 and may be actuated via a trigger located on the pistol grip 600, such that the user may actuate the clutch and hole saw assembly 300 by squeezing the trigger.

In another embodiment, the hole saw nozzle may also comprise a blower, which may be any device or component that produces air current in order to aspirate the flowing agent into proper foam. The blower may be coupled near or at the rear of the end cap 125 and may comprise a high pressure blower wheel and low pressure blower wheel. The high pressure blower wheel and low pressure blower wheel may be operably coupled and driven by the centrifugal wheels of the turbine 255 and planetary gearbox 260. The high pressure blower wheel may provide sufficient pressure to overcome the exhaust pressure of the turbine 255. The low pressure blower wheel preferably draws in air and feeds the air to the turbine 255. Importantly, the blower is preferably in fluid communication with a blower opening and may comprise an air intake located at the upstream end of the outer housing 100 to provide an inlet for air. In this manner, the blower may aerate the foam dispensed into the turbine 255.

It is to be understood that the foregoing general description and the following detailed description are exemplary and explanatory only and are not to be viewed as being restrictive of the embodiments, as claimed. Further advantages of these embodiments will be apparent after a review of the following detailed description, which are illustrated schematically in the accompanying drawings and in the appended claims.

The foregoing description of the illustrative embodiments of the hole saw breaching firefighting nozzle or hole saw nozzle has been presented for the purposes of illustration and description. While multiple embodiments are disclosed, other embodiments will become apparent to those skilled in the art from the above detailed description. As will be realized, these embodiments are capable of modifications in various obvious aspects, all without departing from the spirit and scope of the present disclosure. Accordingly, the detailed description is to be regarded as illustrative in nature and not restrictive.

Although embodiments of the hole saw breaching firefighting nozzle or hole saw nozzle are described in considerable detail, other versions are possible. Therefore, the spirit and scope of the appended claims should not be limited to the description of versions included herein.

Except as stated immediately above, nothing which has been stated or illustrated is intended or should be interpreted to cause a dedication of any component, step, feature, object, benefit, advantage, or equivalent to the public, regardless of whether it is or is not recited in the claims. The scope of protection is limited solely by the claims that now follow, and that scope is intended to be broad as is reasonably consistent with the language that is used in the claims. The scope of protection is also intended to be broad to encompass all structural and functional equivalents.

What is claimed as new and desired to be protected by Letters Patent is set forth in the appended claims:

1. A hole saw breaching firefighting nozzle, comprising:

an outer housing substantially cylindrical in shape and comprising a flow reducer coupled to a downstream end of said outer housing;

an inner housing concentrically disposed within and axially spaced from said outer housing to create an annular flow region between said outer housing and said inner housing;

a diffuser assembly, comprising:

an end cap coupled to an upstream end of said outer housing and having a center opening;

an orifice plate disposed within said inner housing and coupled to said end cap via a plurality of linear bearing shafts; and a flow control ring coupled near an upstream end of said inner housing and disposed between said orifice plate and said end cap, said flow control ring being adapted to slide forward or rearward when said inner housing moves forward or rearward in order to control fluid flow communication between said orifice plate and said annular flow region;

a drivetrain assembly substantially disposed within said inner housing and having an upstream end rotatably coupled to said orifice plate; and a hole saw assembly operably coupled to said drivetrain assembly and rotatably coupled to said flow reducer;

wherein said inner housing is in a sliding relationship with said plurality of linear bearing shafts and adapted to move forward and rearward with respect to said orifice plate and said flow reducer; and wherein a downstream end of said drivetrain assembly is in fluid communication with said annular flow region.

2. The hole saw breaching firefighting nozzle, according to claim 1, wherein said hole saw assembly comprises:

a dog crown rotatably coupled to said flow reducer;

a hole saw disposed within said dog crown and in sliding relationship with said dog crown, said hole saw being coupled to a downstream end of said drivetrain assembly; and one or more hooks, each having a base end rotatably coupled to said dog crown and a mid-portion rotatably coupled to a ring disposed within said hole saw, such that, when said hole saw slides forward or rearward relative to said dog crown, said one or more hooks rotate between a latched position and an unlatched position, respectively.

3. The hole saw breaching firefighting nozzle, according to claim 1, wherein said drivetrain assembly comprises:

a turbine;

a planetary gearbox operably coupled to a downstream end of said turbine; and a mandrel operably coupled to a downstream end of said planetary gearbox.

4. The hole saw breaching firefighting nozzle, according to claim 1, wherein said hole saw assembly further comprises a pilot bit coupled to said mandrel.

5. The hole saw breaching firefighting nozzle, according to claim 1, wherein said planetary gearbox has a reduction ratio between 12:1 and 20:1.

6. The hole saw breaching firefighting nozzle, according to claim 1, further comprising a (U) ball shut-off coupled to an upstream end of said end cap and comprising a ball valve and a hose opening in fluid communication with said center opening of said end cap.

7. The hole saw breaching firefighting nozzle, according to claim 1, further comprising a skirt coupled to a downstream end of said flow reducer.

8. The hole saw breaching firefighting nozzle, according to claim 1, further comprising a handle adapted to actuate said forward and rearward movement of said inner housing.

9. A hole saw breaching firefighting nozzle, comprising:

an outer housing substantially cylindrical in shape and centered about a central longitudinal axis, said outer housing comprising a flow reducer coupled to a downstream end of said outer housing;

an inner housing concentrically disposed within and axially spaced from said outer housing to create an annular flow region between said outer housing and said inner housing, said inner housing comprising one or more gaps at an upstream end of said inner housing;

a diffuser assembly, comprising:

an end cap coupled to an upstream end of said outer housing and having a center opening and an annular space;

an orifice plate disposed within said inner housing and comprising a plurality of orifices disposed in a radial configuration, said orifice plate being coupled to said end cap via a plurality of linear bearing shafts, such that said center opening and said orifice plate are disposed along said central longitudinal axis; and a flow control ring coupled near an upstream end of said inner housing and disposed between said orifice plate and said end cap, said flow control ring being adapted to slide forward or rearward when said inner housing moves forward or rearward in order to control fluid flow communication between said orifice plate and said annular flow region;

wherein when said inner housing moves forward, said flow control ring slides forward and obstructs said plurality of orifices while permitting said fluid flow communication to said one or more gaps of said inner housing, and wherein when said inner housing moves rearward, said flow control ring slides rearward and permits said fluid flow communication to said plurality of orifices, said one or more gaps entering said annular space of said end cap and being obstructed;

a drivetrain assembly substantially disposed within said inner housing and having an upstream end rotatably coupled to said orifice plate, said drivetrain assembly, comprising:

a turbine;

a planetary gearbox operably coupled to a downstream end of said turbine; and a mandrel operably coupled to a downstream end of said planetary gearbox; and a hole saw assembly operably coupled to said drivetrain assembly and rotatably coupled to said flow reducer;

wherein said inner housing is in a sliding relationship with said plurality of linear bearing shafts and adapted to move forward and rearward with respect to said orifice plate and said flow reducer; and wherein a downstream end of said drivetrain assembly is in fluid communication with said annular flow region.

10. The hole saw breaching firefighting nozzle, according to claim 9, wherein said hole saw assembly comprises:

a dog crown rotatably coupled to said flow reducer;

a hole saw disposed within said dog crown and in sliding relationship with said dog crown, said hole saw being coupled to a downstream end of said drivetrain assembly; and a plurality of hooks, each having a base end rotatably coupled to said dog crown and a mid-portion rotatably coupled to a ring disposed within said hole saw, such that, when said hole saw slides forward or rearward relative to said dog crown, said plurality of hooks rotate between a latched position and an unlatched position, respectively.

11. The hole saw breaching firefighting nozzle, according to claim 10, wherein said hole saw assembly further comprises a pilot bit coupled to said mandrel and disposed along said central longitudinal axis.

12. The hole saw breaching firefighting nozzle, according to claim 9, wherein said planetary gearbox has a reduction ratio between 12:1 and 20:1.

13. The hole saw breaching firefighting nozzle, according to claim 9, further comprising a ball shut-off coupled to an upstream end of said end cap and comprising a ball valve and a hose opening in fluid communication with said center opening of said end cap.

14. The hole saw breaching firefighting nozzle, according to claim 9, further comprising a skirt coupled to a downstream end of said flow reducer and comprising a plurality of biasing members.

15. The hole saw breaching firefighting nozzle, according to claim 9, further comprising a handle adapted to actuate said forward and rearward movement of said inner housing.

16. A hole saw breaching firefighting nozzle, comprising:

an outer housing substantially cylindrical in shape and centered about a central longitudinal axis, said outer housing comprising a flow reducer coupled to a downstream end of said outer housing;

an inner housing concentrically disposed within and axially spaced from said outer housing to create an annular flow region between said outer housing and said inner housing, said inner housing comprising one or more gaps at an upstream end of said inner housing;

a diffuser assembly, comprising:

an end cap coupled to an upstream end of said outer housing and having a center opening and an annular space;

an orifice plate disposed within said inner housing and comprising a plurality of orifices disposed in a radial configuration, said orifice plate being coupled to said end cap via a plurality of linear bearing shafts, such that said center opening and said orifice plate are disposed along said central longitudinal axis; and a flow control ring coupled adjacently to said one or more gaps of said inner housing and disposed between said orifice plate and said end cap, said flow control ring being adapted to slide forward or rearward when said inner housing moves forward or rearward in order to control fluid flow communication between said orifice plate and said annular flow region;

wherein when said inner housing moves forward, said flow control ring slides forward and obstructs said plurality of orifices while permitting said fluid flow communication to said one or more gaps of said inner housing, and wherein when said inner housing moves rearward, said flow control ring slides rearward and permits said fluid flow communication to said plurality of orifices, said one or more gaps entering said annular space of said end cap and being obstructed;

a drivetrain assembly substantially disposed within said inner housing and having an upstream end rotatably coupled to said orifice plate, said drivetrain assembly, comprising:

a turbine adapted to move forward and rearward with respect to said orifice plate;

a planetary gearbox operably coupled to a downstream end of said turbine; and a mandrel operably coupled to a downstream end of said planetary gearbox; and a hole saw assembly operably coupled to said mandrel and rotatably coupled to said flow reducer, said hole saw assembly comprises:

a dog crown assembly rotatably coupled to said flow reducer via a stator assembly;

a hole saw disposed within said dog crown and in sliding relationship with said dog crown, said hole saw being coupled to a downstream end of said drivetrain assembly; and a plurality of hooks, each having a base end rotatably coupled to said dog crown and a mid-portion rotatably coupled to a ring disposed within said hole saw, such that, when said hole saw slides forward or rearward relative to said dog crown, said plurality of hooks rotate between a latched position and an unlatched position, respectively; and a pilot bit coupled to said mandrel and disposed along said central longitudinal axis;

wherein said inner housing is in a sliding relationship with said plurality of linear bearing shafts and adapted to move forward and rearward with respect to said orifice plate and said flow reducer; and wherein a downstream end of said drivetrain assembly is in fluid communication with said annular flow region.

17. The hole saw breaching firefighting nozzle, according to claim 16, wherein said planetary gearbox has a reduction ratio between 12:1 and 20:1.

18. The hole saw breaching firefighting nozzle, according to claim 17, further comprising a ball shut-off coupled to an upstream end of said end cap and comprising a ball valve and a hose opening in fluid communication with said center opening of said end cap.

19. The hole saw breaching firefighting nozzle, according to claim 18, further comprising a skirt coupled to a downstream end of said flow reducer and comprising a plurality of biasing members.

20. The hole saw breaching firefighting nozzle, according to claim 19, further comprising a handle adapted to actuate said forward and rearward movement of said inner housing.

* * * * *